(12) United States Patent
Gormley

(10) Patent No.: US 11,074,526 B1
(45) Date of Patent: Jul. 27, 2021

(54) TRANSPORT COORDINATION SYSTEM

(71) Applicant: Skoot Ride.Com Ltd., Surrey (GB)

(72) Inventor: Greg Gormley, Surrey (GB)

(73) Assignee: Skoot Ride.Com Ltd., Surrey (GB)

( * ) Notice: Subject to any disclaimer, the term of this patent is extended or adjusted under 35 U.S.C. 154(b) by 0 days.

(21) Appl. No.: 16/819,810

(22) Filed: Mar. 16, 2020

(51) Int. Cl.
    *H04M 3/42*    (2006.01)
    *G06Q 10/02*    (2012.01)
    *H04W 4/021*    (2018.01)
    *G06Q 50/30*    (2012.01)
    *H04W 4/40*    (2018.01)
    *H04W 4/02*    (2018.01)

(52) U.S. Cl.
    CPC .............. *G06Q 10/02* (2013.01); *G06Q 50/30* (2013.01); *H04W 4/021* (2013.01); *H04W 4/023* (2013.01); *H04W 4/40* (2018.02)

(58) Field of Classification Search
None
See application file for complete search history.

(56) References Cited

U.S. PATENT DOCUMENTS

| 9,739,626 | B2 * | 8/2017 | Lamoriniere | ...... G01C 21/3484 |
| RE47,926 | E * | 3/2020 | Liu | ........................ H04W 4/029 |
| 10,977,590 | B2 * | 4/2021 | Perry | .................. G06F 16/2477 |
| 2021/0099848 | A1 * | 4/2021 | Ruan | ..................... H04W 36/03 |

* cited by examiner

*Primary Examiner* — Amancio Gonzalez
(74) *Attorney, Agent, or Firm* — Brooks, Cameron & Huebsch, PLLC

(57) ABSTRACT

A computer-implemented method of connecting user equipments, i.e. UEs, to coordinate a transport request is disclosed. The method comprises sending a location request message to a plurality of UEs, receiving location response messages from each of one or more UEs of the plurality of UEs, receiving a requested destination message from a first UE, determining a first group of UEs, determining a second group of UEs based upon the location response messages, sending an indicator associated with each UE of the second group of UEs to the first UE, receiving an indicator associated with a second UE of the second group of UEs from the first UE, sending a journey request message to the second UE, receiving an acceptance indication response message from the second UE.

20 Claims, 14 Drawing Sheets

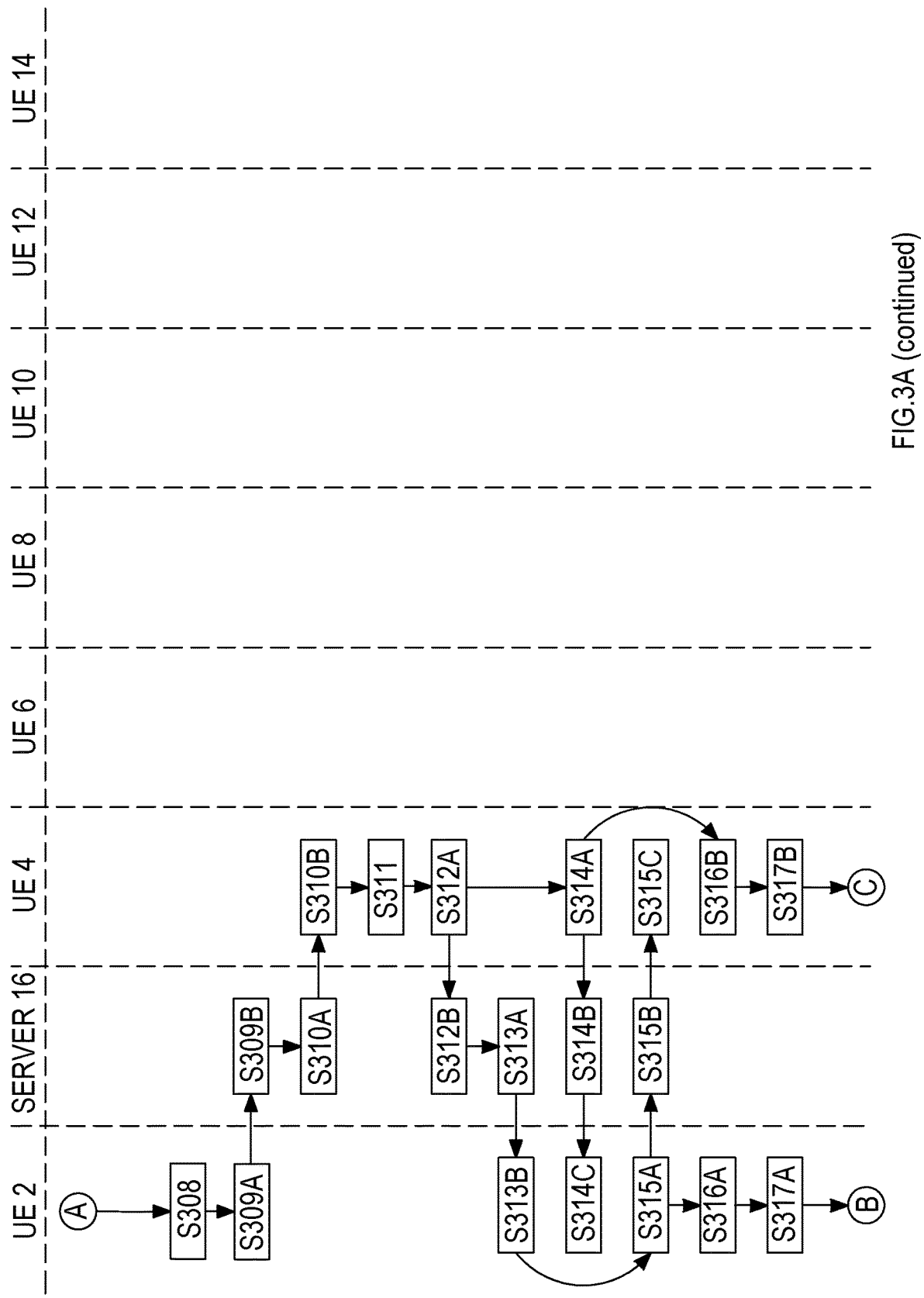

TRANSPORT COORDINATION SYSTEM

FIELD OF INVENTION

The present application relates to transport coordination.

BACKGROUND

Arranging transport by a computer-implemented application for traditional taxi-type manners of ride-sharing is well known. Examples of such applications include the Uber and Lyft systems. Such arrangement of transport, by a computer-implemented application, does not provide solutions for peer-to-peer ride-sharing or transport coordination. Peer-to-peer ride-sharing or transport coordination relies on traditional arrangements, such as a journey requestor having to specifically call a peer to ask for transport to a location. Such traditional approaches lack efficiency in coordinating transport.

There is a need for improved transport coordination in a peer-to-peer ride-sharing. An object of the invention is to address this need, amongst others.

SUMMARY OF INVENTION

In an aspect, there is provided a computer-implemented method of connecting user equipments (UEs) to coordinate a transport request, the method comprising: sending, by a server, a location request message to a plurality of user equipments; receiving, at the server, location response messages from each of one or more UEs of the plurality of UEs in response to the location request message, wherein the location response message from each UE comprises respective location information of the UE; receiving, at a server, a requested destination message from a first UE, the requested destination message comprising location information of a requested destination; determining, by the server, a first group of UEs wherein each UE of the first group is associated with the first UE; determining, by the server, a second group of UEs based upon the location response messages, wherein the second group of UEs is a subset of the first group of UEs; sending, by the server, an indicator associated with each UE of the second group of UEs to the first UE; receiving, at the server, an indicator associated with a second UE of the second group of UEs from the first UE; sending, by the server, a journey request message to the second UE in response to receiving the indicator associated with the second UE, wherein the journey request message comprises the requested destination location information; and receiving, at the server, an acceptance indication response message from the second UE, wherein the journey request response message comprises one of a journey acceptance indicator or a journey rejection indicator.

In this way, a transport coordination application on a first UE can be used to efficiently arrange transport to a destination with a second UE. The method allows for the user of the first UE to arrange the transport with a second user who is connection, such as a friend or acquaintance based upon their location.

Preferably, the method further comprises: determining, by the server, whether the acceptance indication response message comprises the journey acceptance indicator or the journey rejection indicator; sending, by the server, an acceptance notification message to the first UE when the acceptance indication response message comprises the journey acceptance indicator; and sending, by the server, a rejection notification message to the first UE when the acceptance indication response message comprises the journey rejection indicator.

In this way, the server can determine whether a user of the second UE has accepted or rejected the request, and relay this information to a user of the first UE.

Preferably, when the acceptance indication response message comprises the journey acceptance indicator, the method further comprises: receiving, at the server, location information from the second UE and relaying, by the server, the GPS position information of the second UE to the first UE; and displaying, on a user interface of the first UE, a map showing a location of the second UE based upon the relayed location information of the second UE.

In this way, the user of first UE can monitor where the user of the second UE (the driver) is, within transport coordination application, thereby allowing the user of the first UE to know whether the driver is nearby.

Preferably, the method further comprises: displaying, on a user interface of the second UE, a map showing a location of the first UE, and navigational information to a location of the first UE.

In this way, the user of the second UE can be guided to the user of the first UE in order to collect the user of the first UE for the journey. Displaying this information in the transport coordination application improves usability for the second user as they do not need to use a separate navigation application to find the user of the first UE.

Preferably, the method further comprises: determining, at the first UE and/or the second UE, that the first UE and the second UE have a coincident location; and displaying, on a user interface of the second UE, a map with navigational information to a location corresponding to the requested destination location information in response to determining that the first UE and the second UE have a coincident location.

In this way, the user of the second UE can be guided to the destination following collecting the user of the first UE. Displaying this information in the transport coordination application improves usability for the second user as they do not need to use a separate navigation application to reach the destination.

Preferably, the requested destination message further comprises a requested journey time, the requested journey time indicating a time at which a journey to the requested destination is to take place, or a time at which the request destination is to be reached.

In this way, the user of the first UE can arrange a journey for a future time.

Preferably, the method further comprises: receiving, at the server, an indicator associated with a third UE of the second group of UEs from the first UE in response to the server sending the rejection notification message to the first UE.

In this way, transport to the destination can be arranged with an alternative connection if the user of the second UE rejects the request.

Preferably, the method further comprises: sending, by the server, a journey request message to the third UE, wherein the journey request message comprises the requested destination location information; and receiving, at the server, an acceptance indication response message from the third UE, wherein the journey request response message comprises one of the journey acceptance indicator or the journey rejection indicator.

Preferably, the first group of UEs comprises UEs associated with respective user profiles stored at the server that are connected with a first user profile associated with the first UE.

Preferably, determining the second group of UEs based upon the location response messages comprises: determining a predetermined number of UEs of the first group of UEs with respective location information closest to location information of the first UE.

In this way, the user of the first UE is only presented with connections who are geographically nearest to them. This improves the usability as the user is not faced with an extensive list of unsuitable connections who may be too far way to provide transport.

Preferably, location information comprises at least one of geographical coordinates, a GPS position, a GNSS position, a regional navigation system position or a cellular location.

Preferably, determining the second group of UEs further comprises applying one or more filters based upon user profile attributes of user profiles stored at the server and associated with each UE of the first group of UEs.

In this way, the user of the first UE can apply filters to the presented connections. This can be beneficial for user safety in that the user can, for example, select to only be presented with connections of a certain age or sex.

Preferably, sending the location request message to the plurality of UEs comprises sending the location request message to all UEs registered at the server that are associated with a profile having a predetermined attribute stored at the server; and wherein the predetermined attribute indicates that the profile associated with the UE is a profile of a user that is capable of providing transport.

In this way processing times are improved when a user of the first UE requests a journey. By sending location requests to all UEs in the system, the server can maintain a database of UE locations; as the locations of the UEs of the first user's connections are already known when the journey request is received, the server can query the database to determine these locations.

Preferably, sending the location request message to the plurality of UEs comprises sending the location request message to each UE of the first group of UEs.

In this way, the server only needs to request UE locations of UEs associated with connections of the user of the first UE when necessary, in response to a journey request. This can reduce signalling overheads.

Preferably, the method further comprises: displaying, on a user interface of the second UE, journey request information including an indicator of a user profile associated with the first UE and a location based upon the requested destination location information; and providing, by the second UE, an input means to accept or reject a journey request based upon the displayed journey request information.

In this way, the user of the second UE can be presented with information relating the journey request within the transport coordination application.

Preferably, the method further comprises: sending, by the second UE, the acceptance indication response message comprising the journey acceptance indicator to the server in response to a user of the second UE selecting the input means to accept the journey request; or sending, by the second UE, the acceptance indication response message comprising the journey rejection indicator to the server in response to the user second UE selecting the input means to reject the journey request; or sending, by the second UE, the acceptance indication response message comprising the journey rejection indicator to the server in response to the expiration of a predetermined time period when no selection to accept or reject the journey request is input at the input means.

In this way, the user of the second UE can respond to the journey request with an acceptance or rejection. Advantageously, if the user of the second UE does not respond within a predetermined time period the request is deemed rejected; this allows the user of the first UE to make an alternative selection rather than having to wait for the user of the second UE to respond, thereby improving the usability.

Preferably, the method further comprises: accessing, at the first UE, a telephone number of a contact stored in a contact list at the first UE; hashing, at the first UE, the telephone number of the contact to create a hashed contact telephone number; and sending, by the first UE, the hashed contact telephone number to the server.

Preferably, the server stores a plurality of user profiles, each user profile comprising a hashed user telephone number corresponding to a UE associated with the user profile, and the method further comprises: receiving, at the server, the hashed contact telephone number from the first UE; storing, at the server, the hashed contact telephone number in a first user profile associated with the first UE; matching, at the server, the hashed contact telephone number with a hashed user telephone number of a second user profile associated with a second UE; and marking, at the server, each of the first user profile and the second user profile as connections with each other in response to matching the hashed contact telephone number in the first user profile with the hashed user telephone number in the second user profile.

In this way the contacts of the user of the first UE, stored in the address book (or contact list) in their UE, can automatically be connected to the user within the system. Advantageously, hashing the contact telephone numbers provides security and confidentiality within the system, whilst still allowing for the connections to be automatically made.

In another aspect, there is provided a server arranged to: send a location request message to a plurality of user equipments (UEs); receive location response messages from each of one or more UEs of the plurality of UEs in response to the location request message, wherein the location response message from each UE comprises respective location information of the UE; receive a requested destination message from a first UE, the requested destination message comprising location information of a requested destination; determine a first group of UEs wherein each UE of the first group is associated with the first UE; determine a second group of UEs based upon the location response messages, wherein the second group of UEs is a subset of the first group of UEs; send an indicator associated with each UE of the second group of UEs to the first UE; receive an indicator associated with a second UE of the second group of UEs from the first UE; send a journey request message to the second UE in response to receiving the indicator associated with the second UE, wherein the journey request message comprises the requested destination location information; and receive an acceptance indication response message from the second UE, wherein the journey request response message comprises one of a journey acceptance indicator or a journey rejection indicator.

In another aspect, there is provided a non-transitory computer-readable medium storing instructions which, when executed by one or more processors, cause the one or more processors to: send a location request message to a plurality of user equipments (UEs); receive location response messages from each of one or more UEs of the plurality of UEs in response to the location request message, wherein the location response message from each UE comprises respective location information of the UE; receive a requested destination message from a first UE, the requested destination message comprising location information of a requested destination; determine a first group of UEs wherein each UE of the first group is associated with the first UE; determine a second group of UEs based upon the location response messages, wherein the second group of UEs is a subset of the first group of UEs; send an indicator associated with each UE of the second group of UEs to the first UE; receive an indicator associated with a second UE of the second group of UEs from the first UE; send a journey request message to the second UE in response to receiving the indicator associated with the second UE, wherein the journey request message comprises the requested destination location information; and receive an acceptance indication response message from the second UE, wherein the journey request response message comprises one of a journey acceptance indicator or a journey rejection indicator.

BRIEF DESCRIPTION OF THE DRAWINGS

Embodiments of the invention are now described, by way of example, with reference to the drawings in which.

DETAILED DESCRIPTION

A transport coordination, or ride-sharing, system and method are provided in which a user of a transport coordination or ride-sharing application loaded on a first device can request a journey to a destination and a user of the ride sharing application loaded on a second device can accept the request to provide transport for the journey to the destination. The user of the first device can be considered as a 'requestor' or 'passenger' and the user of the second device can be considered a 'driver'.

Figure 1:
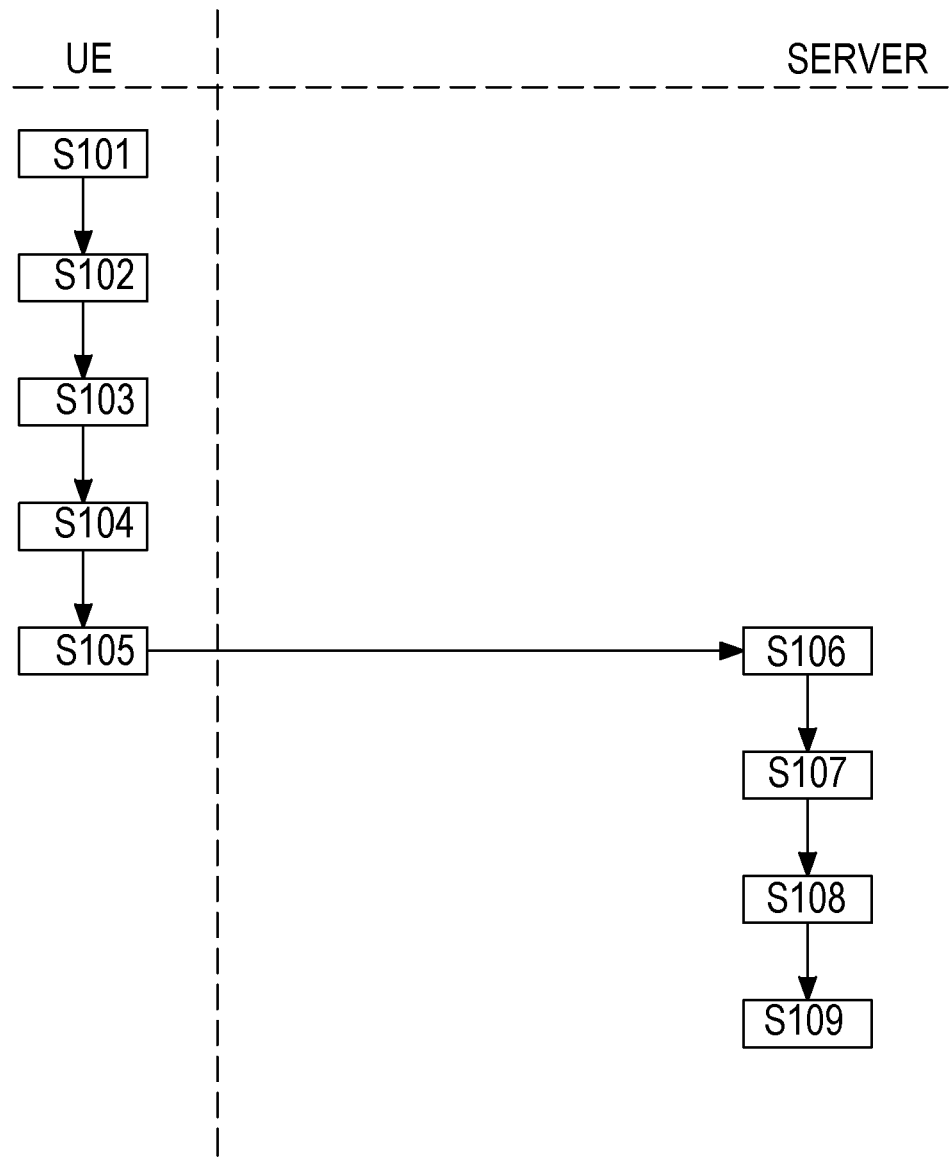
FIG. 1 is a flow diagram of the operational steps involved in registering a user of the transport coordination system.

FIG. 1 shows a flow diagram of the operational steps involved in registering a user of the transport coordination system. In examples, this can occur before coordinating transport as subsequently described with reference to FIGS. 3A, 3B and 5.

A user installs the transport coordination application on a device or UE (user equipment), such as a smartphone device. At step S101, when the user opens the application for the first time they are presented with a registration interface. In an example the registration interface requests the user to enter personal information such as a telephone number and name. In some examples other personal information, such as contact information including home and/or work address, payment information and any other suitable information may also be entered at this stage, in other examples it may be entered later. In some examples, a user may register and login using a connected third party application, particularly a social application, such as SnapChat. In addition to registering as a requestor or passenger, a user can also register as a driver. When registering as a driver, the user may be prompted to enter a vehicle registration number, and/or scan a copy of their driver's license which is then verified. A user profile of a user who can act as a driver can include an attribute indicating that the user is a driver. The application also asks for device permissions to receive push notifications. At step S102 the user enters the requisite personal information. The application also requests access to the address book of the UE, which the user can grant.

At step S103, the application hashes the user's telephone number (i.e. the telephone number of the UE). At step S104, the application also hashes the contact telephone numbers of the user's contacts from the address book. In an example the application uses MD5 hashing, although any other suitable type of hashing may instead be used. The application can store the hashed contact telephone numbers and the contact's name in a hash table at the UE. At step S105, the application sends the hashed user telephone number, as well as the other personal information, to a server that hosts the transport coordination system. The application also sends the hashed contact telephone numbers to the server.

Figure 2:
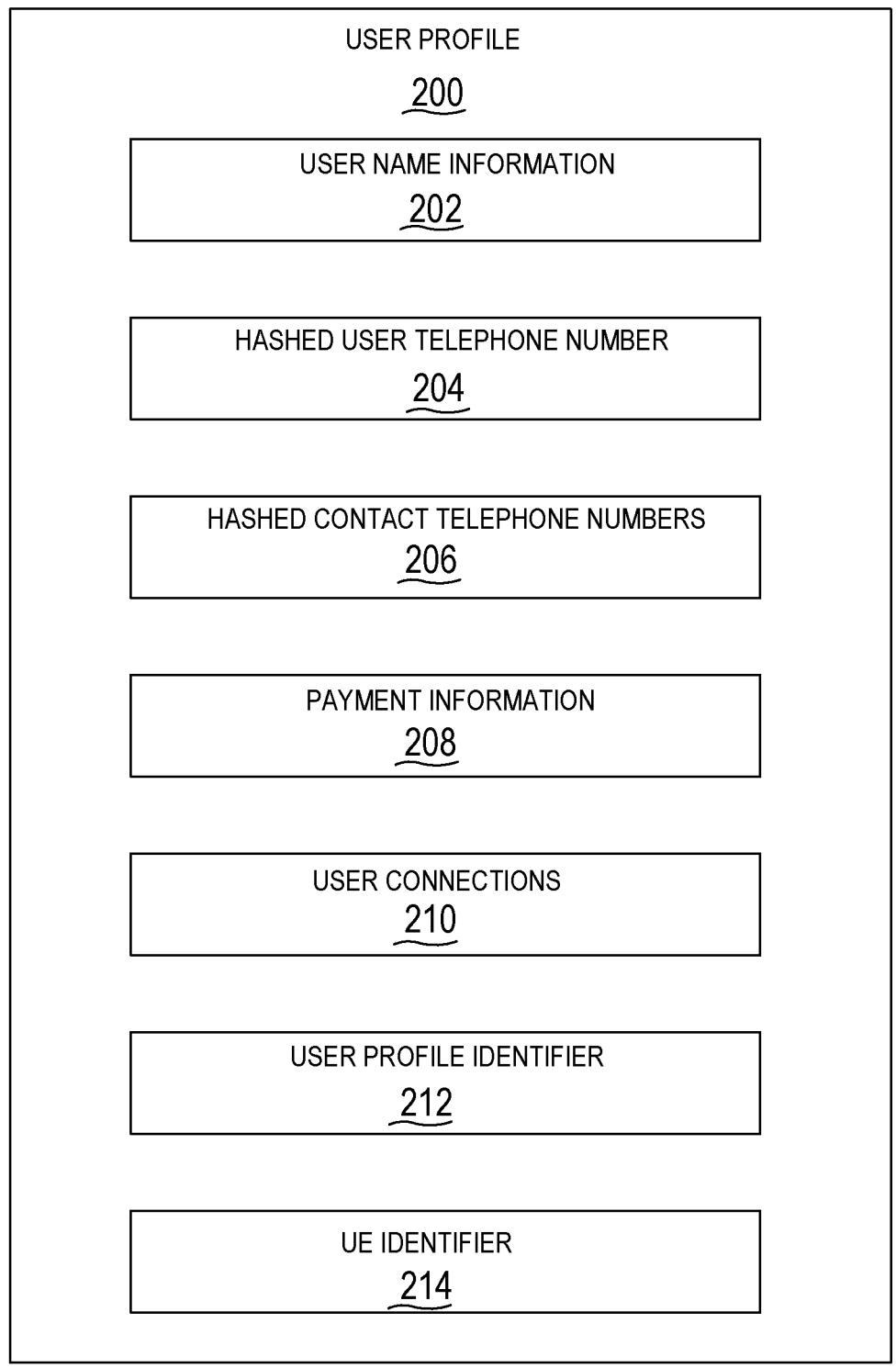
FIG. 2 is a block diagram of a user profile of the transport coordination system.

At step S106, the server receives the user's personal information, the hashed user telephone number and hashed contact telephone numbers, and stores this information in a user profile of the user at the server. FIG. 2 shows an exemplary block diagram of a user profile 200 stored at the server, including the user's name information 202, the plain and the hashed user telephone number 204, the hashed contact telephone numbers 206, payment information 208, the user's connections 210 to other users of the transport coordination system, a user profile identifier 212 such as a unique reference number associated with the user profile, and a UE identifier 214 of the UE associated with the user profile 200, such as an International Mobile Station Equipment Identity (IMEI). In some examples, the payment information is tokenized and the server stores tokens issued by a partner payment service provider; payments can then be requested with these tokens. The user profile can also include a driver attribute for users who are verified as drivers within the system. User profiles with the driver attribute can be considered as 'driver profiles'. In some examples, only users with the driver attribute can act as drivers, whereas all users can act as requestors. The skilled person will readily understand that any other suitable user information can be stored in the user profile 200.

At step S107, the server matches the hashed contact telephone numbers with matching hashed user telephone numbers of other user profiles registered with the transport coordination service. That is, contacts of the user who are already registered with the transport coordination service, and whose respective hashed user telephone numbers are already stored at the server in their own respective profiles, are matched with the user by way of the matching hashed contact telephone numbers.

At step S108, the server connects the user's profile with the profiles of the other users with a hashed user telephone number matching one of the user's hashed contact telephone numbers 206, thereby establishing a connection between the users of the transport coordination system such that the users are connections within the system. These connections can be considered first-level connections.

Any unidentified hashed contact telephone numbers, that is hashed contact telephone numbers that do not match a hashed user telephone number in an existing user profile, are stored at the server in a 'waiting list' associated with the user profile. In this way, when a new user joins the system, the new user's hashed user telephone number may be matched against the hashed contact telephone number in the existing user's 'waiting list'. In this way the new user and the existing user can be associated as connections in the system. The hashed contact telephone number is then deleted from the 'waiting list'.

At step S109, the server may determine the respective first-level connections of each of the first-level connections associated with the user's profile and connect these to the user's profile as second-level connections.

In some examples, the application may detect a change to the user's address book at the UE. For example, the user may have added a new contact to their address book. When this occurs the application hashes this new contact telephone number and sends it to the server where it is stored in the user's profile as a hashed contact telephone number. If this hashed contact telephone number matches an existing hashed user telephone number of another user profile stored at the server, a connection is established between the users such that the users are connections within the system. In this way, if the user adds a new contact to the address book of the UE and the new contact is also a user of the transport coordination system, the user and the new contact become connections within the transport coordination system. Within the application, a list of friends (i.e. the user's connections within the system) is pulled from the server, this allows the friend list to be refreshed each time the user accesses the friend list within the application.

The application can be set to a 'requestor' mode wherein the user can request transportation to their requested destination from other users of the application that have their application set to a 'driver' mode. Likewise, the application can also be set to such a 'driver' mode wherein the user can provide transportation to the requested destination of a user who is in the 'requestor' mode.

Figure 3A:
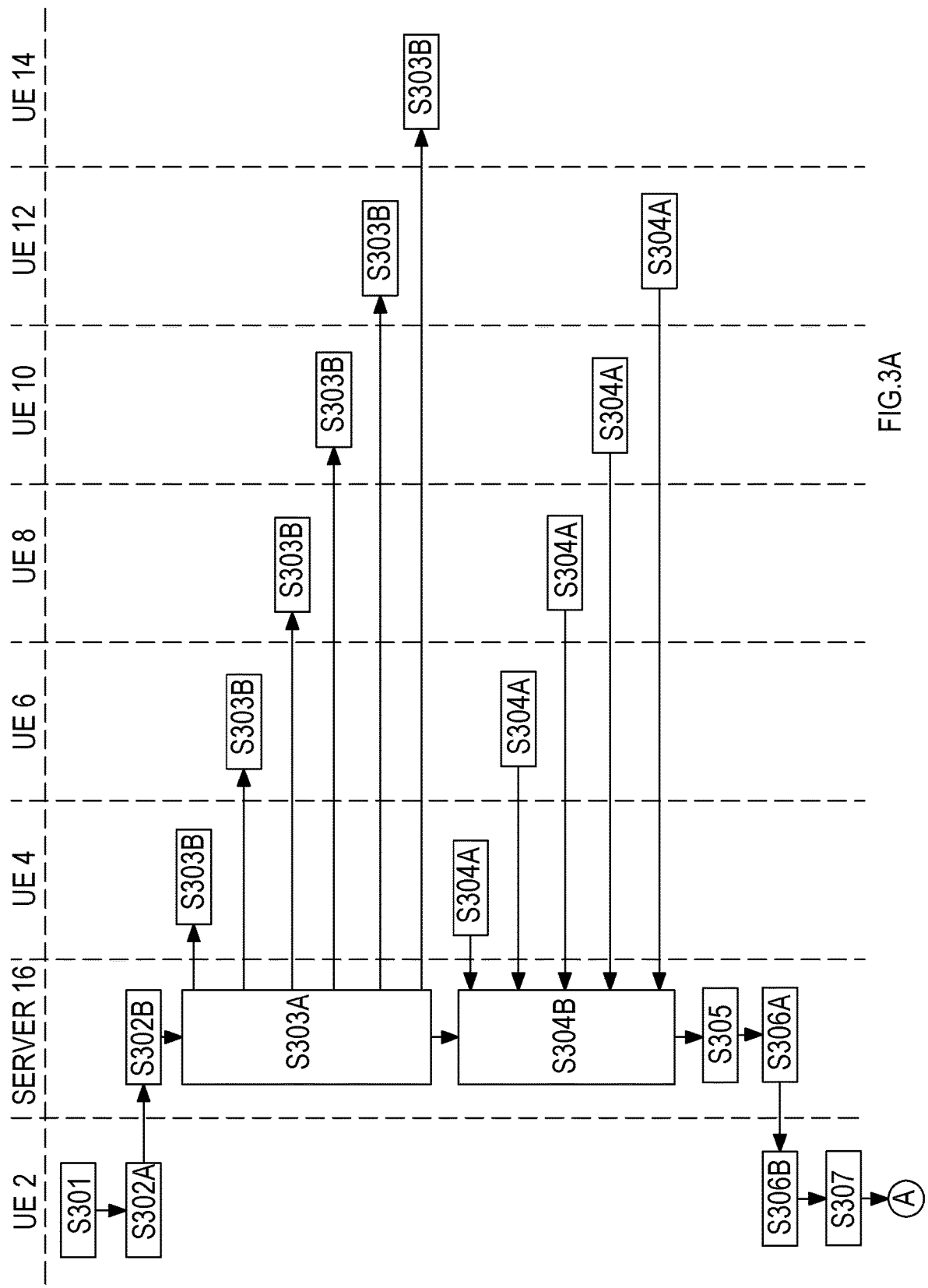
FIG. 3A is a flow diagram of a first example of the operational steps of interactions between entities in the transport coordination system.
Figure 3A:
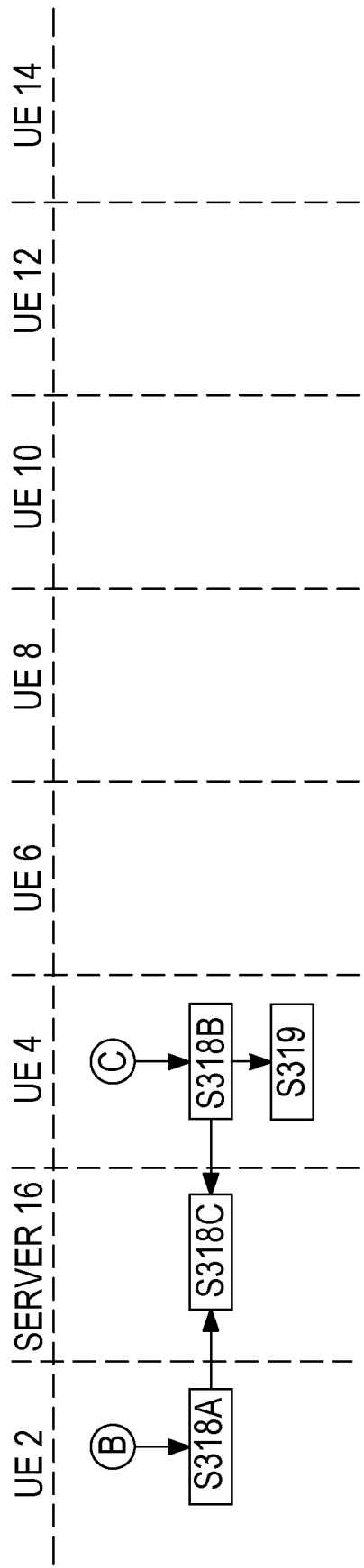
Figure 4:
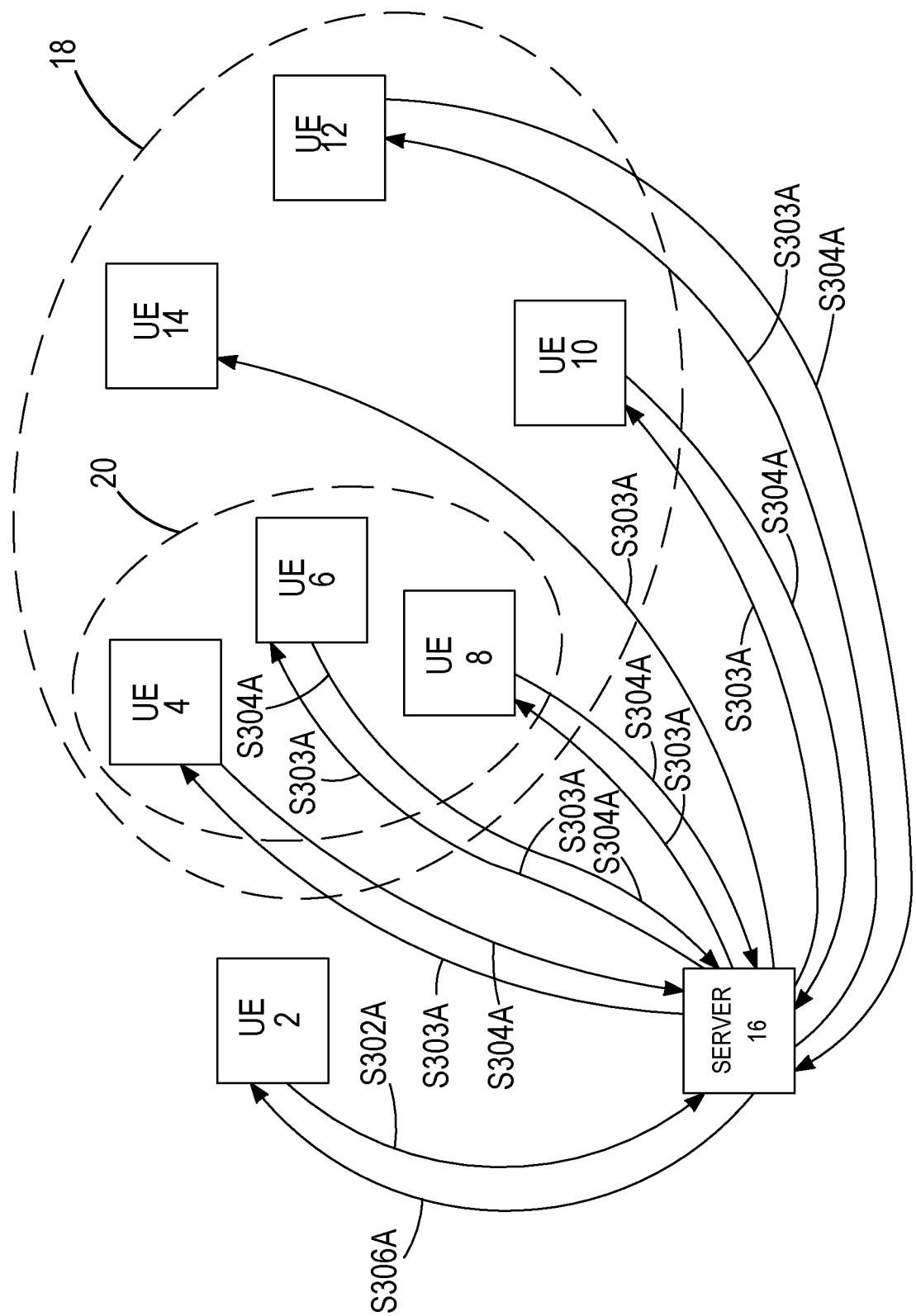
FIG. 4 is a conceptual network diagram of the transport coordination system corresponding to the first example of the operational steps of interactions between entities in the transport coordination system.

FIG. 3A shows a flow diagram of the operational steps of interactions between entities in the system involved in a user (i.e. the requestor) of a first UE 2 in the transport coordination system requesting a journey to a destination and a user (i.e. the driver) of a second UE 4 in the transport coordination system accepting the request to provide transport for the journey to the destination. FIG. 4 shows a conceptual network diagram of steps S302A to S306A of the example of FIG. 3A, in particular with reference to a first UE 2, a server 16, and UEs associated with connections within the system of the user of the first UE 2 (that is, a second UE 4, a third UE 6, a fourth UE 8, a fifth UE 10, a sixth UE 12 and a seventh UE 14).

At step S301 an application loaded on a first UE 2, that is a UE of a user or requestor in the 'requestor' mode, presents a user interface on a display of the first UE 2 in which the user can enter a requested destination for a journey.

At step S302A the application sends the requested destination to the server 16 as a requested destination message. The requested destination message comprises the present GPS location of the first UE 2 and the GPS location of the requested destination. Any other suitable location information in place of GPS locations can be used. It will be understood that whenever GPS location and navigation are described throughout the description of all embodiments in the present disclosure, any other suitable type of location information and navigation can be used as alternatives, for example other GNSS systems, regional navigation systems, a coordinate system, and cellular location amongst others. At step S302B the server 16 receives the requested destination message. In other examples, the first UE 2 can send its present GPS location separately to the requested destination message.

At step S303A the server 16 sends a location request query message to UEs associated with each of the connections of the user of the first UE 2 that have driver profiles stored in the system; that is, UEs corresponding to users whose profiles the user of the first UE 2 is connected to, as in step S108. In an example, the user of the first UE 2 is connected to a user with which the second UE 4 is associated, a user with which the third UE 6 is associated, a user with which the fourth UE 8 is associated, a user with which fifth UE 10 is associated, a user with which a sixth UE 12 is associated, and a user with which a seventh UE 14 is associated. The second UE 4, third UE 6, fourth UE 8, fifth UE 10, sixth UE 12 and seventh UE 14 can be considered a first group 18 of UEs, the first group 18 of UEs being the UEs associated with connections of the user of the first UE 2. The skilled person will readily understand that first group of UEs can have fewer or greater than six UEs; this is only an example in which the user of the first UE 2 has six connections within the system. The user of the first UE 2 may have any number of connections in other examples. Each of the UEs in the first group 18 has the transport coordination application loaded thereon. At step S303B each UE of the first group 18 that is capable of receiving the location request query message receives location request query message.

At step S304A all available UEs of the first group of UEs reply to the location request query message with a location query response message comprising their present GPS position (or other suitable location information). An available UE can be a UE at which the user of the application loaded thereon has set a status in the application as being available to provide transport (i.e. a driver mode). In the example of FIGS. 3 and 4 the second UE 4, third UE 6, fourth UE 8, fifth UE 10 and sixth UE 12 are available and reply with a location query response message. An unavailable UE, such as the seventh UE 14 in the example of FIGS. 3 and 4, can be a UE which does not respond to the location request query message with a location query response message. In some examples the unavailable UE may not respond because it is switched off, does not have a suitable connection to receive the location request query message, or because the user of the unavailable UE has set a status in the application loaded thereon as being unavailable to provide transport (i.e. a non-driver mode). In the example of FIGS. 3 and 4, the seventh UE 14 does not reply.

At step S304B the server 16 receives the location query response messages.

At step S305 the server 16 determines, from the received location query response messages, a second group of UEs 20. The second group of UEs is a subset of the first group of UEs comprising a predetermined number of the closest UEs to the first UE 2 based upon the present GPS location indicated in the corresponding location query response message. That is, from the location query response messages, the server 16 determines a number of closest UEs of the first group of UEs to the present GPS location of the first UE 2.

That is, the server 16 determines which of the connections of the user of the first UE 2 are closest to the user based upon the GPS location of their respective UEs in the first group. In the example of FIGS. 3 and 4 the predetermined number of UEs is three (the second UE 4, third UE 6 and fourth UE 8). The skilled person will however understand that this is only exemplary and the predetermined number of UEs in the second group of UEs can be any suitable number including all of the UEs in the first group of UEs which provide a location query response message.

Filters may be applied before determining the connections in the second group. For example, when entering the requested destination (S301) in the application, the user may also select one or more filters to be applied. These filters can then be included in the requested destination message (S302A) sent to the server 16. Examples of filters can include a preference for 'favourite' friends, a filter for connections above or below a certain age, a filter for only female or male connections, a filter for connections only within a certain distance or that would provide the journey within a certain price, or a filter for only first or second level connections. The skilled person will readily understand that any other suitable filters can also be used. In an example, the filters may be applied to show a number of favourite friends as well as a number of geographically closest friends. The filters are applied as defined by the user within the application; one or more filters may be applied. The server 16 can determine the filters included in the requested destination message and apply these selected filters to the user profiles associated with each of the UEs from which the location response message has been received. The second group of UEs can then be determined based upon the UEs associated with the filtered connections rather than all of the UEs from which the location response message has been received.

At step S305 the server 16 further determines the distance from each of the UEs in the second group of UEs to the location of the first UE 2, then to the requested journey destination and back to the starting point of the UE in the second group. In an example, the determined distance is based on calculated a GPS navigation route between the three points. For each UE of the second groups of UEs, the server 16 then calculates a first estimated cost for the journey and a second estimated cost for the journey. The first estimated cost can be based on a first unit price per mile multiplied by the number of miles calculated from the respective UE of the second group, to the location of the first UE 2, then to the requested destination, and then back to the current location of the UE of the second group. The second estimated cost can be based on a second unit price per mile multiplied by the number of miles calculated from the respective UE of the second group to the location of the first UE 2, then to the requested destination, and then back to the current location of the UE of the second group. In an example, the first estimated cost is an estimate of the price to be charged to the requestor, and the second estimated cost is an estimate of the payment to be paid to the driver. In such an example, the first unit price per mile may be higher than the second unit price per mile, thereby making the first estimated cost higher than the second estimated cost.

At step S306A the server 16 generates and sends a driver option message comprising the user profile identifier of the user profile associated with each UE in the second group, with the respective first estimated costs for the journey, to the first UE 2. At step S306B the first UE 2 receives the driver option message.

At step S307 the application loaded on the first UE 2 determines, from the user profile identifiers included in the driver option message, the connection associated with each UE in the second group of UEs. The first UE 2 can query the user database at the server 16 to identify the connections from the user profile identifiers. In the example of FIGS. 3 and 4 these connections are the users of the second UE 4, the third UE 6 and the fourth UE 8. The identity of the users of the UEs in the second group, and the corresponding first estimated journey price for each is then presented to the user of the first UE 2 at step S308.

At step S308, the application loaded on the first UE 2 presents, on a display of the first UE 2, an interface comprising information relating to the users of each UE in the second group (in the example of FIGS. 3 and 4, this would be the user of the second UE 4, the user of the third UE 6 and the user of the fourth UE 8). The information presented may comprise the name of the connection and/or a profile photograph. The respective first estimated cost for the journey is presented with the information relating to the users of each UE in the second group. The displayed information is interactive in that the user of the first UE 2 can select the presented connection that they wish to request to provide transport, e.g. by driving them, for the journey to the requested destination. In an example, the presented interface may be on a touchscreen interface at which the user of the first UE 2 can select their preferred connection to be the driver by pressing a name, image or other information associated with the connection displayed on the touchscreen. In the example of FIG. 3A, the user of the first UE 2 selects the user of the second UE 4.

At step S309A, in response to the user of the first UE 2 selecting their desired connection as the driver for the journey, the first UE 2 generates a driver selection message comprising an indicator of the user's selection of a connection associated with a UE of the second group. The indicator of the user's selection of connection comprised in the driver selection message can be the user profile identifier associated with the selected connection. The first UE 2 then sends the driver selection message to the server 16. At step S309B the server 16 receives the driver selection message.

At step S310A, the server 16 determines the UE of the second group that corresponds to the user profile identifier comprised in the driver selection message, for example by matching the user profile identifier 212 to the UE identifier 214 stored in the user profile 200. The server 16 then generates a journey request message to send to the UE corresponding to the user profile identifier comprised in the driver selection message (the second UE 4, in the example of FIG. 3A). The journey request message comprises the second estimated cost for the journey calculated for the second UE 4, the requested destination, and the user profile identifier of the user profile associated with the first UE 2 (i.e. the user profile identifier of the requestor). The server 16 then sends the journey request message to the determined UE of the second group.

At step S310B, the journey request message is received by the UE associated with the connection requested to be the driver (i.e. the second UE 4 in the example of FIG. 3A). The second UE 4 uses the user profile identifier included in the journey request message (i.e. the user profile identifier of the user profile associated the first UE 2) to identify the connection who has requested transport to the destination, for example by querying the user database at the server 16.

At step S311 the application loaded on the second UE 4 presents, on a display of the second UE 4, an interface comprising the identification of the user of the first UE 2 (i.e. the requestor), the requested destination, and the second estimated cost for the journey. The application loaded on the second UE 4 presents the user of the second UE 4 with an option to accept or reject the journey request.

In the example of FIG. 3A, the user of the second UE 4 accepts the journey request by selecting an 'accept' option presented on the interface. Alternatively, the user of the second UE 4 can choose to reject the journey request, or may not respond to the journey request; this is described in more detail with respect to FIG. 5.

Returning to FIG. 3A, at step S312A, in response to the selection of the 'accept' option, the application loaded on the second UE 4 then generates an acceptance indication message comprising an acceptance indicator that indicates that the user of the second UE 4 has accepted the request to transport the user of the first UE 2 to the requested destination. The second UE 4 then sends the acceptance indication message, comprising the acceptance indicator, to the server 16.

At step S312B, the server 16 receives the acceptance indication message from the second UE 4 and determines whether the acceptance indication message includes an acceptance or rejection indicator. In example of FIG. 3A, the server 16 determines that the acceptance indication message includes the acceptance indicator.

At step S313A, in response to determining that the acceptance indication message includes an acceptance indicator, the server 16 generates and sends an acceptance notification message to the first UE 2. At step S313B, the first UE 2 receives the acceptance notification message and determines that the user of the second UE 4 has accepted the request to provide transport for the journey.

At step S314A, following sending the acceptance indication message comprising the acceptance indicator at S312A, the second UE 4 sends GPS position information of the second UE 4 to the server 16. This GPS position information is transmitted constantly or at predetermined regular intervals such that a live feed of the GPS position of the second UE 4 is sent to the server 16. At step S314A the second UE 4 also presents, on the display of the second UE 4, an interface comprising a map with navigation to the GPS position of the first UE 2.

At step S314B, the server 16 receives the feed of GPS position information from the second UE 4 and relays this feed of GPS position information to the first UE 2.

At step S314C, the first UE 2 receives the relayed feed of GPS position information of the second UE 4 from the server 16. Also at step S314C the first UE 2 presents, on the display of the first UE 2, an interface showing the live GPS position of the second UE 4 on a map.

Optionally, at step S315A, following receiving the acceptance notification message and determining that the user of the second UE 4 has accepted the request to provide transport for the journey at S313B, the first UE 2 sends GPS position information of the first UE 2 to the server 16. This GPS position information is transmitted constantly or at predetermined regular intervals such that a live feed of the GPS position of the first UE 2 is sent to the server 16.

Optionally, at step S315B, the server 16 receives the feed of GPS position information from the first UE 2 and relays this feed of GPS position information to the second UE 4.

Optionally, at step S315C, the second UE 4 receives the relayed feed of GPS position information of the first UE 2 from the server 16 to guide the user of the second UE 4 to the current location of the first UE 2. The second UE 4 can present, on a display, a map with navigational guidance to the location of the first UE 2.

Steps S314A-C and S315A-C can happen simultaneously such that the first UE 2 presents the live GPS position of the second UE 4 (i.e. the live location of the user of the second UE 4 who is acting as the driver) to enable the user of the first UE 2 (the requestor) to know how close the user of the second UE 4 (the driver) is, and so that the user of the second UE 4 (the driver) is presented with a live indication of the first UE 2 so as to provide guidance to the first UE 2 (i.e. the live location of the user of the first UE 2 who is acting as the requestor) so that they can be picked up for the journey.

Rather than providing guidance to a live location of the first UE 2 in steps S315A-C, the second UE 4 may alternatively provide guidance to location of the first UE 2 included with the requested destination message (step S302A).

Steps S314A-C and S315A-C may continue until the GPS positions of the first UE 2 and the second UE 4 are coincident or proximal to one another within a predetermined distance, for example 10 metres. Alternatively or additionally, steps S314A-C and S315A-C may continue until a user of either the first UE 2 or the second UE 4 indicates to the application that the user of the second UE 4 has reached and picked up the user of the first UE 2.

In more detail, at step S316A, the first UE 2 can determine that the GPS position of the first UE 2 and the second UE 4 are coincident or within a predetermined distance of one another. Upon this determination, the first UE 2 generates and sends a collection notification message to the server 16 to indicate that the user of the second UE 4 (the driver) has now reached the user of the first UE 2 (the requestor) and collected them for the journey. In this way, collection of the requestor by the driver can be automatically determined without a specific user input. Alternatively or additionally, the application loaded on the first UE 2 can display an interactive option on the display of the first UE 2 which when selected generates and sends the collection notification message to the server 16. In this way, the server 16 can be reliably notified that the driver has collected the requestor.

At step S316B, the second UE 4 can determine that the GPS position of the second UE 4 and the first UE 2 are coincident or within a predetermined distance of one another. Upon this determination, the second UE 4 generates and sends a collection notification message to the server 16 to indicate that the user of the second UE 4 (the driver) has now reached the user of the first UE 2 (the requestor) and collected them for the journey. Alternatively or additionally, the application loaded on the second UE 4 can display an interactive option on the display of the second UE 4 which when selected generates and sends the collection notification message to the server 16.

In some embodiments, steps S316A and S316B may offer alternative methods by which the server 16 can determine that the collection of the requestor by the driver has occurred. That is, in such an embodiment only one of the first UE 2 or the second UE 4 generates and sends the collection notification message. In this case, the server 16 notifies the other UE that it is aware that collection has occurred by generating and sending a collection acknowledgement message to the other UE. For example, only the UE of the driver (in this example the second UE 4) may present the user (the driver) with the interactive option on the display of the second UE 4 which when selected generates and sends the collection notification message to the server 16. In another example, only the UE of the requestor (the first UE 2) may present the user (the requestor) with the interactive option on the display on the first UE 2 which when selected generates and sends the collection notification message to the server 16.

In other embodiments, steps S316A and S316B may be both be required for the server 16 to determine that the collection of the requestor by the driver has occurred. In an example, collection notification messages may be required to be sent from the first UE 2 and the second UE 4 in response to both UEs determining that the GPS position of the first UE 2 and the second UE 4 are coincident or within a predetermined distance of one another before the server 16 determines that the collection has occurred. In another example, collection notification messages may be required to be sent from the first UE 2 and the second UE 4 in response to the respective users selecting the interactive option on the display before the server 16 determines that the collection has occurred. In another example, the server 16 may receive a collection notification message from one UE in response to the determination that the GPS positions are coincident, and a collection notification message from the other UE in response to the selection of the interactive option on the display, before the server 16 determines that the collection has occurred.

In another alternative to steps S316A and S316B, the server 16 may determine, from the feeds of GPS position information received from the second UE 4 and the first UE 2 at steps S314B and S315B, when the first UE 2 and second UE 4 are coincident or within a predetermined distance of one another. Optionally, the server 16 may send a notification to the first UE 2 and second UE 4 indicating that it is aware that the collection of the requestor by the driver has occurred.

Following the determination, in step S316A, by the first UE 2 that collection has occurred the application loaded on the first UE 2 presents the user (the requestor) with information relating to the journey at step S317A. Alternatively, step S317A may occur in response to the server 16 notifying the first UE 2 that it is aware that the collection has occurred with the collection acknowledgement message. The information relating to the journey may comprise an estimated arrival time, an elapsed journey time, a remaining journey time, an elapsed distance from the collection point, a remaining distance to the destination, GPS navigation on a map to the destination, or any other suitable information.

Following the determination in step S316B, by the second UE 4 that collection has occurred, the application loaded on the second UE 4 presents the user (the driver) with a map and GPS navigation to the destination. Alternatively, step S317B may occur in response to the server 16 notifying the second UE 4 that it is aware that collection has occurred with the collection acknowledgement message.

Steps S316A and S316B continue until the destination is reached.

At step S317A, the first UE 2 determines that the current GPS position of the first UE 2 is at or within a predetermined distance, such as 50 metres, of the GPS location of the destination; that is, the first UE 2 determines that the destination has been reached. The application loaded on the first UE 2 then presents a journey completion notification on the display of the first UE 2. Alternatively or additionally, the first UE 2 may present an interactive option on the display during step S316A which, when selected, causes the first UE 2 to determine at step S317A that the destination has been reached. Following the determination that the destination has been reached, the first UE 2 generates a journey complete message to send to the server 16.

At step S317B, the second UE 4 determines that the current GPS position of the second UE 4 is at or within a predetermined distance, such as 50 metres, of the GPS location of the destination; that is, the second UE 4 determines that the destination has been reached. The application loaded on the second UE 4 then presents a journey completion notification on the display of the second UE 4. Alternatively or additionally, the second UE 4 may present an interactive option on the display during step S316B which, when selected, causes the second UE 4 to determine at step S317B that the destination has been reached. Following the determination that the destination has been reached, the second UE 4 generates a journey complete message to send to the server 16.

At step S318A, following the generation of the journey complete message at S317A, the first UE 2 sends the journey complete message to the server 16.

At step S318B, following the generation of the journey complete message at S317B, the second UE 4 sends the journey complete message to the server 16.

At step S318C, the server 16 receives the journey complete message(s) from the first UE 2 and/or the second UE 4. Upon receipt of the journey complete message(s), the server 16 determines that the journey is complete and the first UE 2 and the second UE 4 have reached the requested destination of the user of the first UE 2.

In some examples, only one of the UEs (that is, either the first UE 2 or the second UE 4) generates and sends the journey complete message to the server 16. For example, only the first UE 2 generates and sends the journey complete message to server 16 (and steps S317B and S318B do not occur) for the server 16 to determine that the journey is complete. Alternatively, only the second UE 4 generates and sends the journey complete message to server 16 (and steps S317A and S318A do not occur) for the server 16 to determine that the journey is complete.

In other examples, both the first UE 2 and the second UE 4 generate and send the journey complete message to the server 16. That is, both UEs need to report that they have reached the destination for the server 16 to determine that the journey is complete at step S318C.

At step S319, in response to the second UE 4 determining that the destination has been reached at S317B, the application loaded on the second UE 4 presents on the display of the second UE 4 a GPS navigation interface to guide the user of the second UE 4 back to their original location when the journey request message was first received at S310B, or to another destination of the choosing of the user of the second UE 4. Step S319 may alternatively be initiated in response to the server 16 sending a journey complete acknowledgement message to the second UE 4 in response to having received a journey complete message from the first UE 2 at step S318C.

Step S319 may be optional in that the user of the second UE 4 may indicate to the application, by way of an interactive option presented on the display of the second UE 4, that they wish to also travel to the destination and will not therefore require GPS navigation to return to their starting point.

Figure 3B:
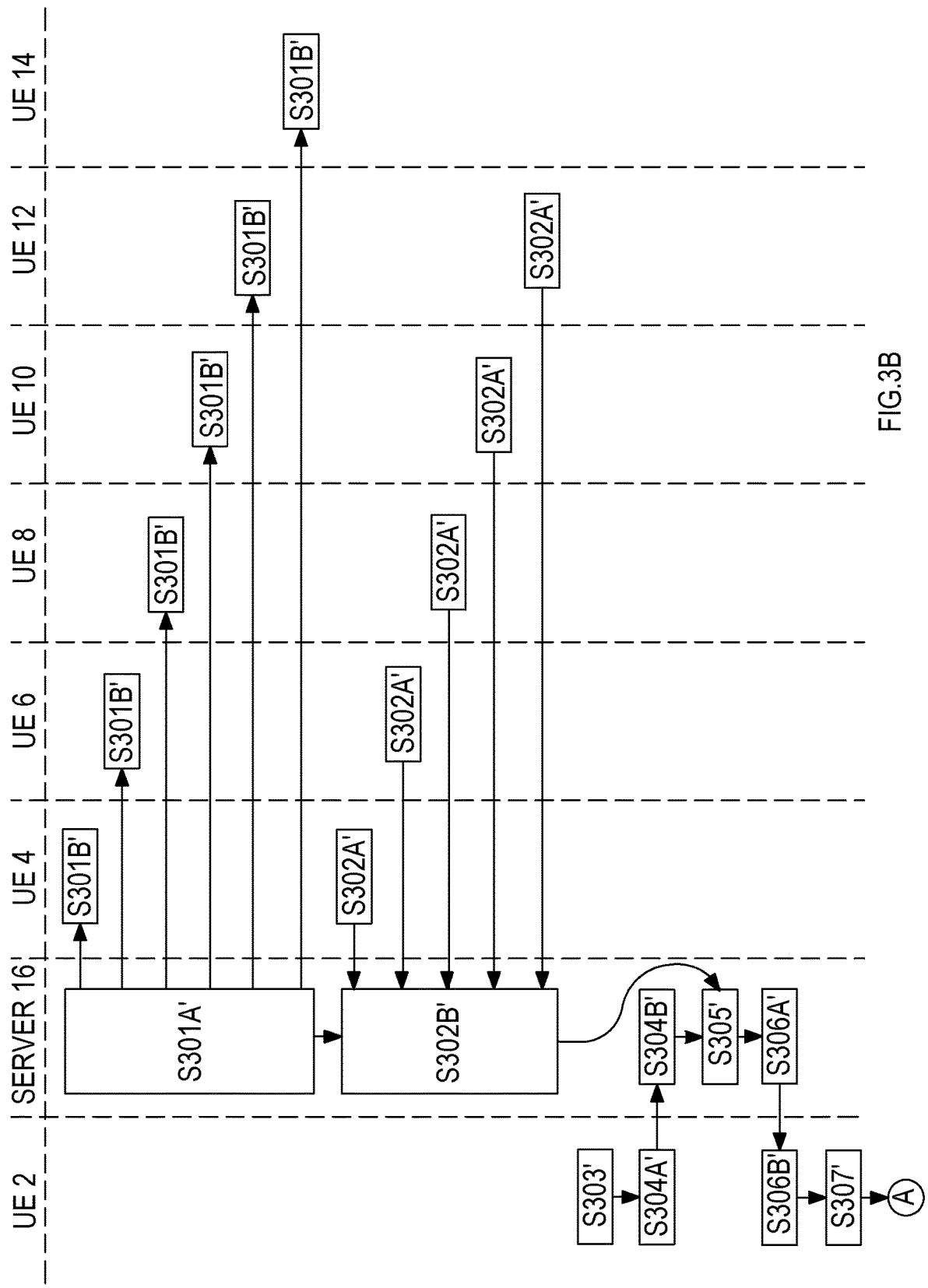
FIG. 3B is a flow diagram of a second example the operational steps of interactions between entities in the transport coordination system.
Figure 3B:
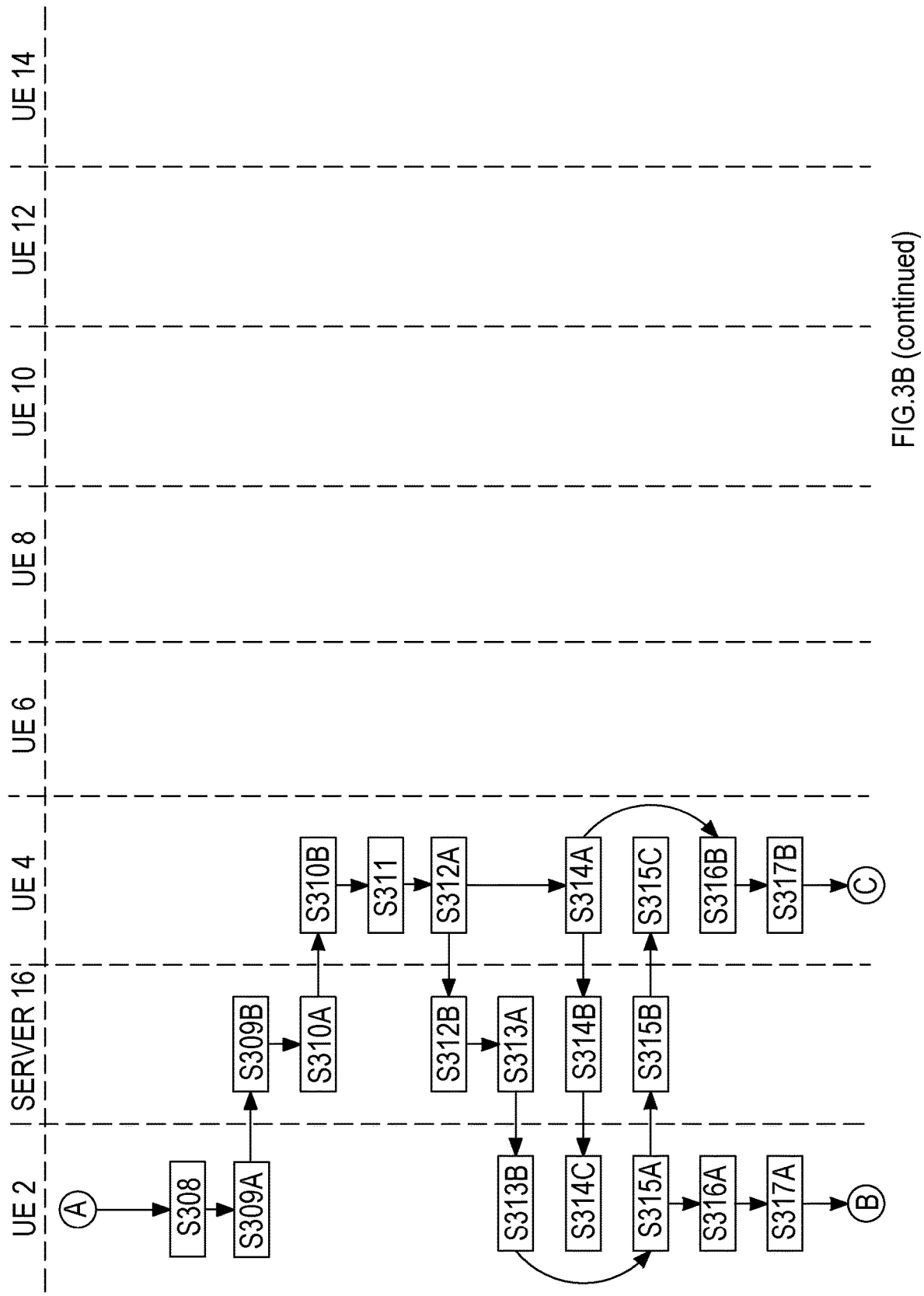
Figure 3B:
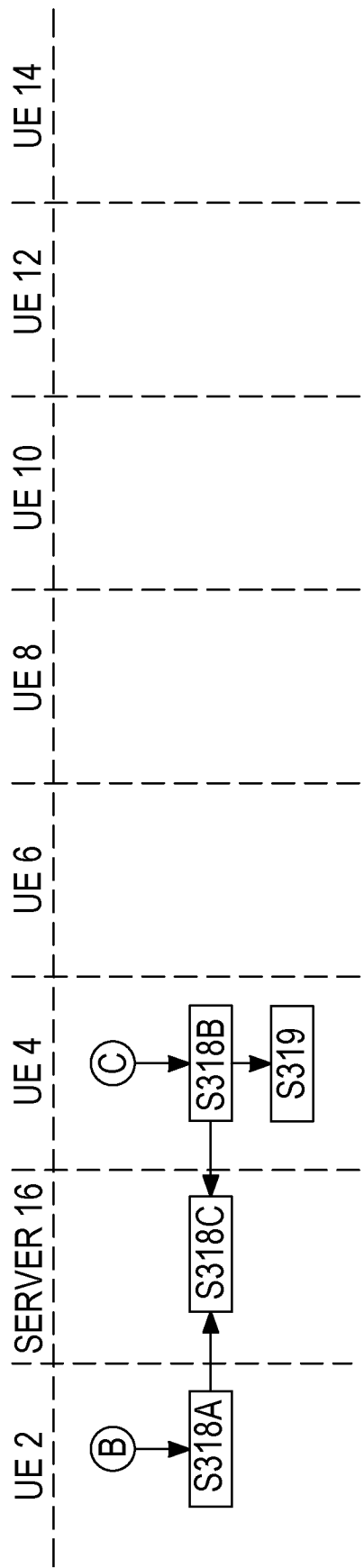

FIG. 3B shows an alternative to FIG. 3A, wherein steps S301 to S307 are replaced by steps S301A' to S307'. Steps S308 to S319 of FIG. 3B correspond to steps S308 to S319 in FIG. 3A; that is the same steps occur in steps S308 to S319 in FIG. 3B as in FIG. 3A.

The main distinction between FIG. 3A and FIG. 3B is that in FIG. 3B location request query messages are sent before the requested destination message is received from the first UE 2. The process starts with the server repeatedly sending location request query messages to all UEs in the system (rather than only UEs associated with connections of the user) that are associated with all user profiles having a driver attribute (user profiles of user's who are drivers), and receiving location query response messages from all available UEs in the system that are associated with all user profiles having a driver attribute. These locations are then stored, and subsequently accessed, when the requested destination message is received at the server.

In more detail, at step S301A' the server sends location request query messages to UEs associated with all user profiles stored at the server which have the driver attribute. That is, the location request query message is sent to all UEs in the system associated with driver profiles, but for clarity in FIG. 3B only UE 4, UE 6, UE 8, UE 10, UE 12 and UE 14 are shown. The skilled person will readily understand that location request query messages can be sent to any number of UEs. At step S301B' all UEs in the system that are capable of receiving the location request query message receive the location request query message (UE 4, UE 6, UE 8, UE 10, UE 12 and UE 14 in the example of FIG. 3B).

At step S302A' all available UEs respond to the location request query message with a location query response message comprising their present GPS position (or other suitable location information). At step S302B' the server receives the location query response messages and stores the location information of each of the UEs in a database. In the example of FIG. 3B, the second UE 4, the third UE 6, the fourth UE 8, the fifth UE 10, and the sixth UE 12 send location query response messages, and the seventh UE 14 is unavailable.

Steps S301A', S301B', S302A' and S302B' are then repeated at pre-determined intervals such that the server can maintain an up-to-date database storing location information of all UEs in the system that are associated with driver user profiles.

At step S303' the application loaded on the first UE 2, that is the UE of the user or requestor in the 'requestor' mode, presents a user interface on the display of the first UE 2 in which the user can enter a requested destination for a journey.

At step S304A' the application sends the requested destination to the server 16 as a requested destination message. The requested destination message comprises the present GPS location of the first UE 2 and the GPS location of the requested destination. In other examples, any other suitable location information in place of GPS locations can be used. At step S304B' the server 16 receives the requested destination message. In other examples, the first UE 2 can send its present GPS location separately to the requested destination message.

At step S305' the server 16 determines the desired destination based upon the location information of the requested destination included in the requested destination message. The server 16 also determines the present location of the first UE 2 based upon the location information of the first UE 2 included with the requested destination message. The server 16 then queries the database storing the location information of all UEs in the system that are associated with driver user profiles (as updated at step S302B') to identify a first group of UEs, wherein the first group of UEs are UEs associated with user profiles connected to the user profile associated with the first UE 2. The server then determines a second group of UEs, which is a subset of the first group of UEs. The second group of UEs includes a predetermined number of UEs from the first group that are closest to the first UE. That is, the server 16 determines a number of connections of the user of the first UE 2 that are geographically closest to the user based upon the location information of the first UE and the location information of the UEs in the first group. As in step S305 of FIG. 3A, filters may be applied at step S305' of FIG. 3B.

As in step S305 of FIG. 3A, at step S305' of FIG. 3B the server 16 further determines the distance from each of the UEs in the second group of UEs to the location of the first UE 2, then to the requested journey destination and back to the starting location of the UE in the second group, and calculates the first estimated cost for the journey and the second estimated cost for the journey.

As in step S306A of FIG. 3A, at step S306A' of FIG. 3B the server 16 generates and sends the driver option message comprising the user profile identifier of the user profile associated with each UE in the second group, with the respective first estimated costs for the journey, to the first UE 2. At step S306B' the first UE 2 receives the driver option message.

As in step S307 of FIG. 3A, at step S307' of FIG. 3B the application loaded on the first UE 2 determines, from the user profile identifiers included in the driver option message, the connection associated with each UE in the second group of UEs.

The process of FIG. 3B then continues through steps S308 to S319 as described with reference to FIG. 3A.

Figure 5:
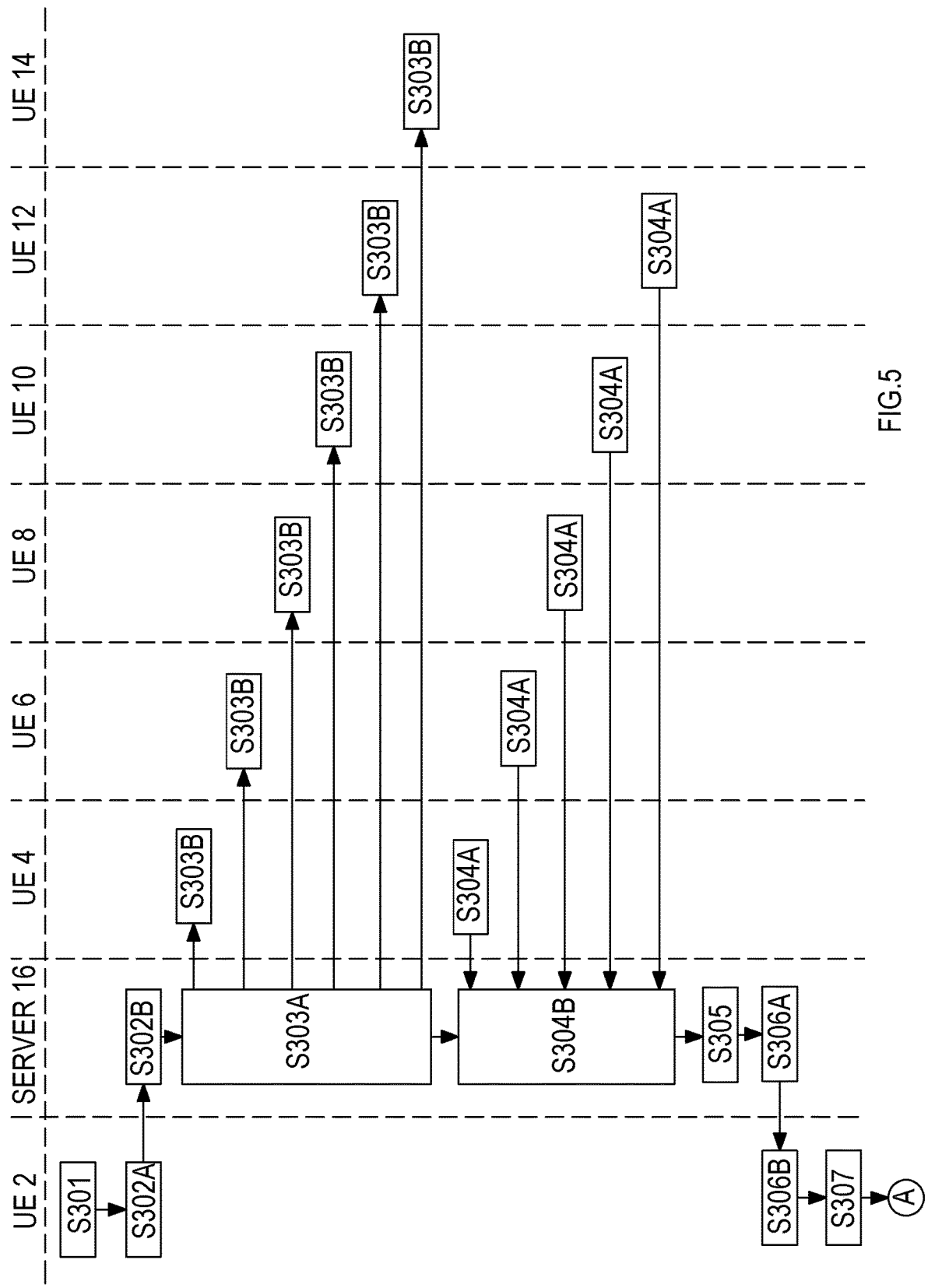
FIG. 5 is a flow diagram of the operational steps of interactions between entities in the transport coordination system.
Figure 5:
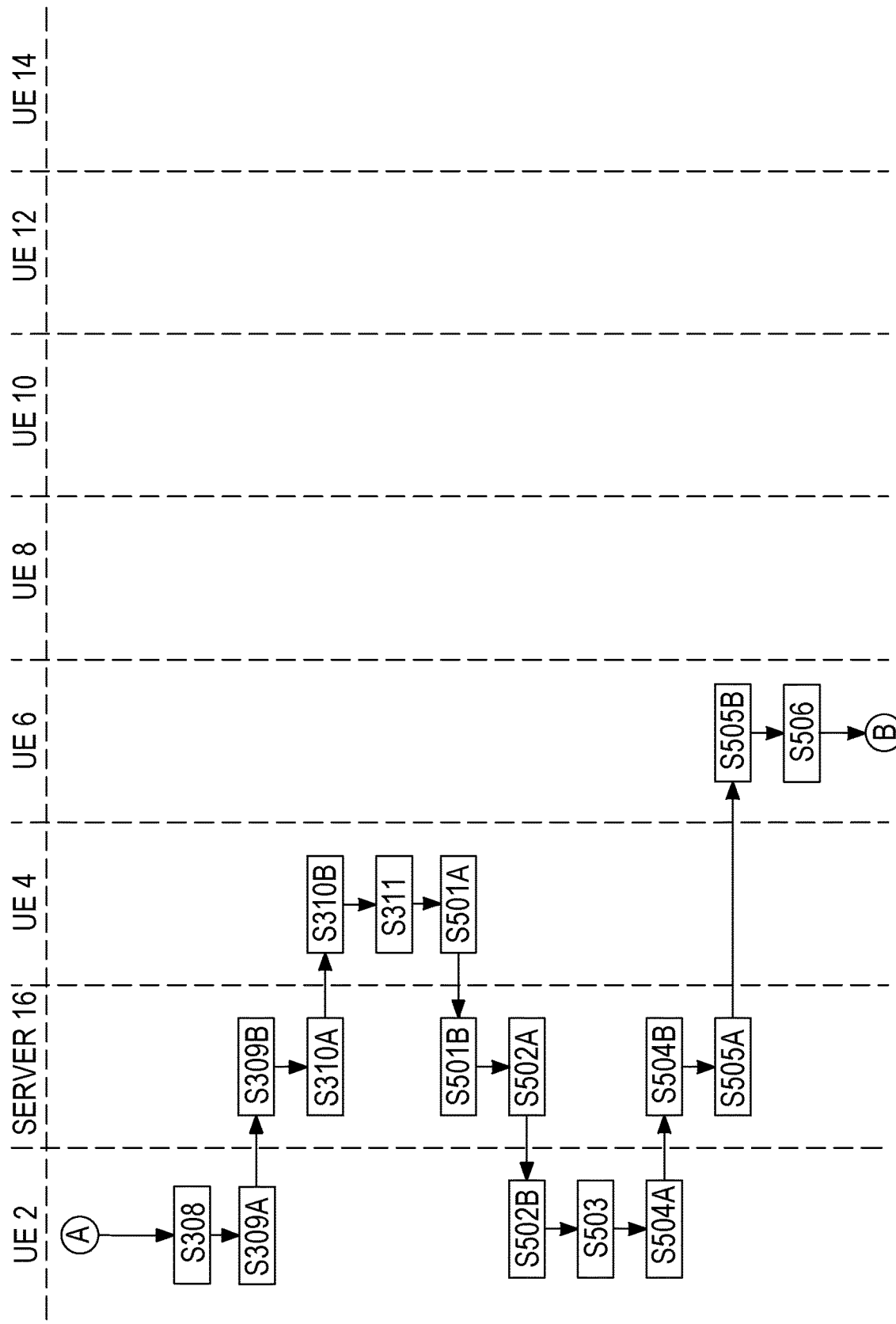
Figure 5:
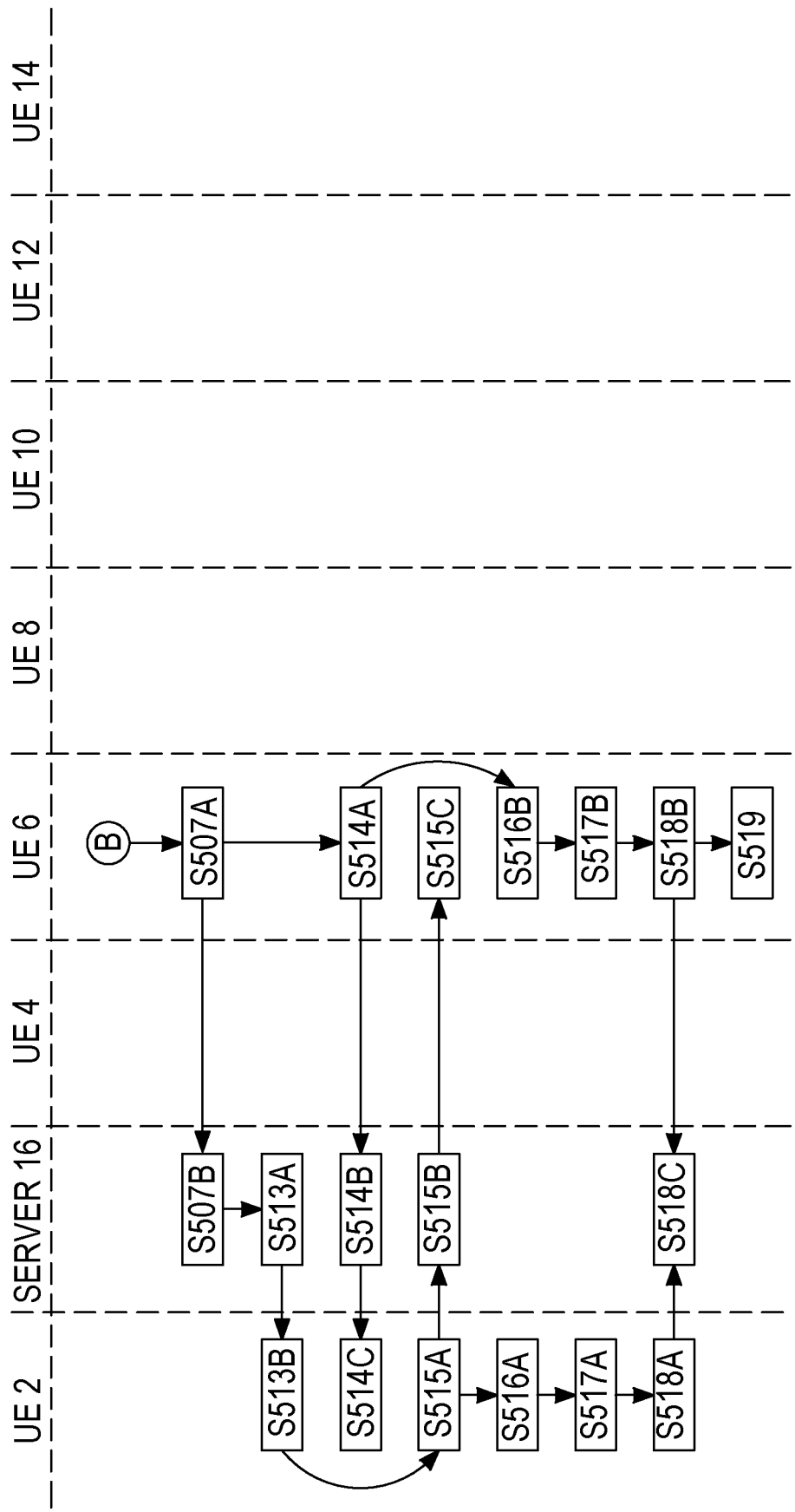

FIG. 5 shows a flow diagram of the operational steps of interactions between entities in the system involved in a user (i.e. the requestor) of a first UE 2 in the transport coordination system requesting a journey to a destination and a user of a second UE 4 in the transport coordination system rejecting the request to provide transport for the journey to the destination, or the request being deemed rejected. The flow diagram then shows the operational steps of interactions between entities in the system involved in the user of the first UE 2 instead requesting a journey to the destination and a user (i.e. the driver) of a third UE 6 in the transport coordination system accepting the request to provide transport for the journey to the destination.

Steps S301 to S311 in FIG. 5 correspond to steps S301 to S311 in FIG. 3A.

In the example of FIG. 5, the user of the second UE 4 selects the option to reject the journey presented at step S311. At step S501A, in response to the selection of the 'reject' option, the application loaded on the second UE 4 generates an acceptance indication message comprising a rejection indicator that indicates that the user of the second UE 4 has rejected the request to transport the user of the first UE 2 to the requested destination. The second UE 4 then sends the acceptance indication message, comprising the rejection indicator, to the server 16.

In an alternative, the acceptance indication message comprising the rejection indicator can be generated in response to the expiration of a predetermined time period (for example 60 seconds, 120 seconds, or any other suitable time period) following the receipt of the journey request message, if no response is selected by the user of the second UE 4 during the predetermined time period.

At step S501B, the server 16 receives the acceptance indication message from the second UE 4 and determines whether the acceptance indication message includes an acceptance or rejection indicator. In the example of FIG. 5, the server 16 determines that the acceptance indication message includes the rejection indicator. Alternatively or additionally, if the server 16 does not receive an acceptance indication message from the second UE 4 in response to the journey request message, within a predetermined time limit (for example 60 seconds), the server 16 can determine a rejection to the journey request message.

In response to determining that the acceptance indication message comprises the rejection indicator or that no acceptance indication message has been received from the second UE 4 within the predetermined time limit, at step S502A the server 16 generates and sends a rejection notification message to the first UE 2. At step S502B, the first UE 2 receives the rejection notification message and determines that the user of the second UE 4 has rejected the request to provide transport for the journey.

At step S503, in response to receiving the rejection notification message, the application loaded on the first UE 2 again presents on the display of the first UE 2 the interface comprising information relating to the users of each UE in the second group. At this stage, as the user of the second UE 4 has rejected the request, the option for selecting the user of the second UE 4 may be made un-selectable or removed from the interface. In this way, the user of the first UE 2 can select an alternate connection to be the driver in response to the rejection from the user of the second UE 4. In the example of FIG. 5, the user of the first UE 2 selects the user of the third UE 6.

At step S504A, in response to the user of the first UE 2 selecting the second choice desired connection as the driver for the journey, the first UE 2 generates a second driver selection message including the user profile identifier associated with the selected connection. The first UE 2 then sends the second driver selection message to the server 16. At step S504B the server 16 receives the second driver selection message.

At step S505A, the server 16 determines the UE of the second group that corresponds to user profile identifier comprised in the second driver selection message. As in step S310A, the server 16 then generates and sends a journey request message to send to the UE corresponding to the user profile identifier comprised in the driver selection message (the third UE 6, in the example of FIG. 5). The journey request message comprises the second estimated cost for the journey calculated for the third UE 6, the requested destination, and the user profile identifier of the user profile associated with the first UE 2 (i.e. the user profile identifier of the requestor).

At step S505B the journey request message is received by the UE associated with the connection requested to be the driver (i.e. the third UE 6 in the example of FIG. 5). Likewise to step S310B, the third UE 6 uses the user profile identifier included in the journey request message (i.e. the user profile identifier associated with the first UE 2) to identify the connection who has requested transport to the destination.

Likewise to step S311 of FIG. 3A, at step S506 the application loaded on the third UE 6 presents, on a display of the third UE 6, an interface comprising the identification of the user of the first UE 2 (i.e. the requestor), the requested destination, and the second estimated cost relating to the third UE 6 for the journey. The application loaded on the third UE 6 presents the user of the third UE 6 with an option to accept or reject the journey request.

In the example of FIG. 5, the user of the third UE 6 accepts the journey request by selecting an 'accept' option presented on the interface. In other examples the user of the third UE 6 may reject the request; in such an example the process of steps S501 to S506 is repeated until a further connection associated with a UE in the second group accepts the request. If all of the connections with UEs in the second group reject the journey request, the server 16 sends a notification to the first UE 2 that no driver is available for the journey. Alternatively, when all of the drivers in the second group reject the journey request, the server 16 may increase the size of the second group and indicate further connections associated with UES from the first group of UEs who have replied to the location request query message. The application loaded on the first UE 2 may then present these further connections as options to request to be the driver for the journey. In such an example, if all of the connections with UEs that responded to the location request query message at step S302A reject the journey request, the server 16 sends a notification to the first UE 2 that no driver is available for the journey.

Returning to the example of FIG. 5, at step S507A in response to the selection of the 'accept' option, the application loaded on the third UE 6 then generates an acceptance indication message comprising an acceptance indicator that indicates that the user of the third UE 6 has accepted the request to transport the user of the first UE 2 to the requested destination. The third UE 6 then sends the acceptance indication message, comprising the acceptance indicator, to the server 16.

At step S507B the server 16 receives the acceptance indication message from the third UE 6 and determines whether the acceptance indication message includes an acceptance or rejection indicator. In example of FIG. 5, the server 16 determines that the acceptance indication message includes the acceptance indicator.

The process then proceeds to step S513A. Steps S513A to S519 correspond to steps S313A to S319 respectively in FIGS. 3A and 3B, only with the third UE 6 in place of the second UE 4.

In an alternative to FIG. 5, steps S301 to S311 of FIG. 5 can be replaced by steps S301A' to S311 described with reference to FIG. 3B.

In further examples, relating to FIGS. 3A, 3B and 5, the journey to the requested destination can be booked in advance. In such examples the user of the first UE can input a requested journey time when inputting the requested destination at step S301 or S303'. This requested journey time is then included in the requested destination message at step S302A in the example of FIGS. 3A and 5, and step S304A' in the example of FIG. 3B. The requested journey time can indicate a future time for the journey to begin, or for the requested destination to be reached. In the example of FIGS. 3A, 3B and 5, the requested journey time is then sent by the server to the second UE 4 at step S310A (and the third UE 6 in the case of FIG. 5 at step S505A) in the journey request message. The requested journey time is then also displayed on the interface at step S311 (and step S506). In such examples, the UE associated with the driver (the second UE 4 or third UE 6) can then guide the driver to pick up the requestor at the desired journey time, or at a time calculated so as to reach the requested destination at the desired time.

Following the completion of the journey, for example as described with reference to FIGS. 3A, 3B and 5, the final cost is calculated.

In an example, the final cost can be calculated based upon three parts (part A, part B and part C).

Part A: The calculated or estimated distance from the location of the UE of the driver provided in the location query response message (at step S304A in FIGS. 3A and 5, or step S302A' in FIG. 3B) to the location of the first UE indicated with the requested destination message (S302A in FIGS. 3A and 5, or step S304A' in FIG. 3B).

Part B: The actual measured elapsed journey distance from when the driver picks up the requestor (at steps S316A, S316B in FIGS. 3A and 3B; at steps S516A, S516B in FIG. 5) until the destination is reached (at step S317A, S317B in FIGS. 3A and 3B; at steps S517A, S517B in FIG. 5). In this way, any deviations due to traffic issues, additional passenger pickups, or other diversions during the journey are accounted for.

Part C: The calculated or estimated distance from the final destination back to the original location of the UE of the driver provided in the location query response message (at step S304A in FIGS. 3A and 5, or step S302A' in FIG. 3B).

The final cost is then calculated as (A+B+C) multiplied by the unit price per mile. The first final cost (the amount charged to the requestor) is calculated using the first unit price per mile. The second final cost (the amount paid to the driver) is calculated using the second unit price per mile. As described, the first unit price per mile may be higher than the second unit price per mile.

In some examples, the requestor may be pre-charged the first estimated cost when the transport is arranged, and then charged the difference between the first estimated cost and the first final cost when the journey is complete. In this way, any discrepancy between the estimated cost and the final cost due to extra distance travelled is accounted for.

Figure 6:
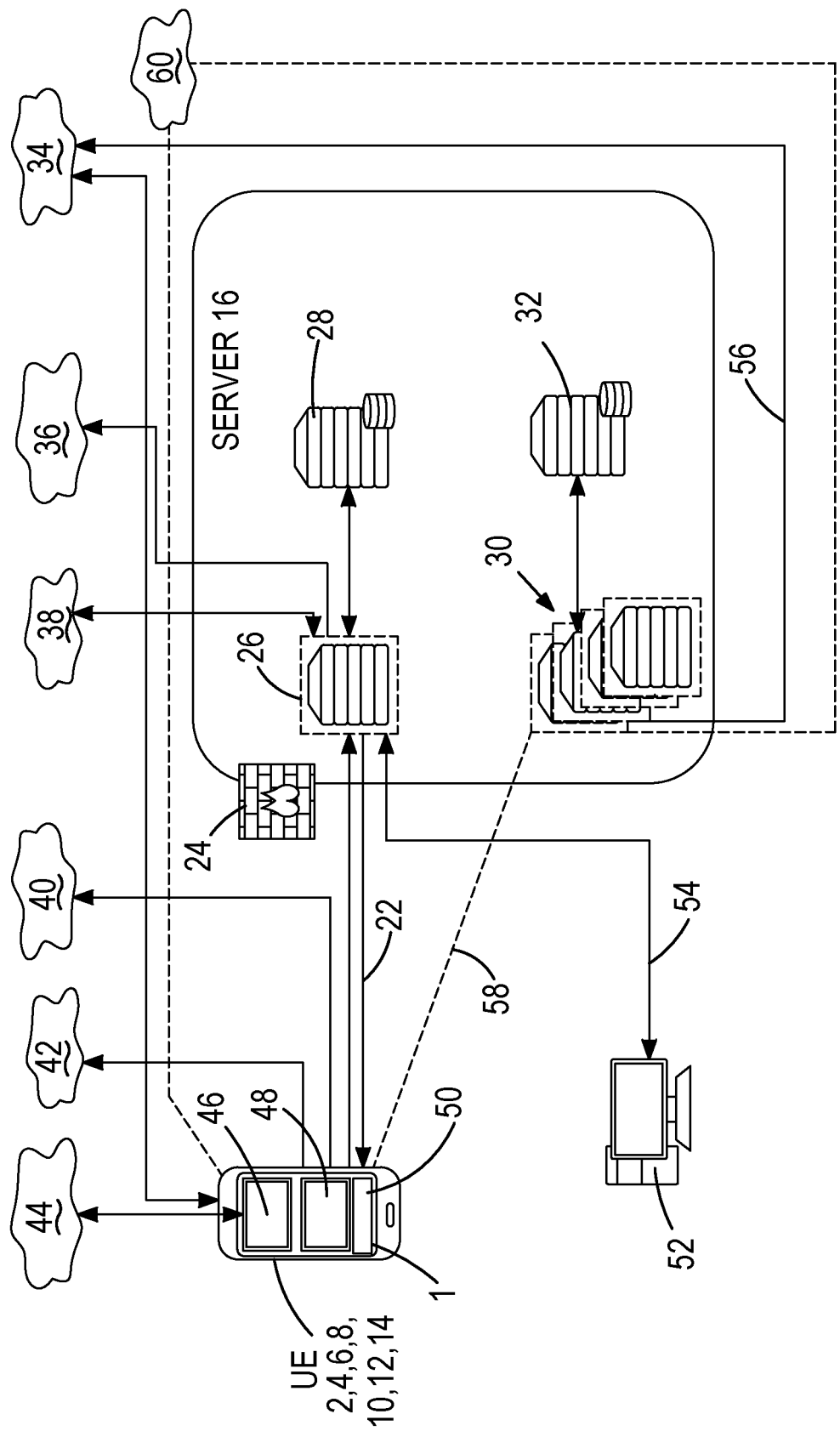
FIG. 6 is a block diagram of architecture of the transport coordination system.

FIG. 6 presents a server 16 and UE architecture corresponding the system and methods described with reference to FIGS. 1 and 3 to 5.

The server 16 may comprise one or more servers hosted on a cloud-based platform, such as an Amazon Web Services (AWS) cloud-computing platform. Alternatively, the server 16 may be a private server specifically for use with the transport coordination system. The server 16 comprises a first API 26, such as a PHP-based API 26, which executes token authentication 22 when the UE 2, 4, 6, 8, 10, 12, 14 logs onto the system using the transport coordination application 1. In some examples the first API 26 is the main API which handles user data, meta trip data and user sessions. Interaction with the server 16 may be controlled by a firewall 24. The server 16 further comprises a first database 28, such as an SQL database or more specifically a MySQL database, in communication with the first API 26. The first database can store user data such as user profiles 200, trip meta-data, payment data, admin data and support data. The server 16 further comprises a second API 30, such as a Python-based API, in communication with the first API 26. The second API 30 can be in constant contact with the first API 26. In some examples, the second API 30 may be distributed across multiple servers. The second API 30 is responsible for real time location data; a Python API is appropriate for such a purpose in terms of speed and handling multiple sessions with users at a time. In some examples the first API 26 suited to onboarding users of the system and the second API 30 is suited to processing real time rides that are occurring. In some examples, the application 1 may be able to communicate with the Python API 30 by direct Python calls 58. The second API 30 is in communication with a second database 32, such as an SQL database or more specifically a PostgreSQL database. The second database 32 can store real-time location data and user location history. The second database 32 can be faster and allows for better processing of large amounts of real-time data. Versioning improves efficiency in the application and splits the workloads of the APIs; this allows for scaling for high numbers of users. The second API 30 communicates data and notifications 56 with the UE 2, 4, 6, 8, 10, 12, 14 by a cloud messaging service 34, such as a Firebase cloud messaging service. Such data and notifications can include the messages sent between the UEs and the server 16 as described with reference to FIGS. 1 and 3 to 5; these messages may be sent using the cloud messaging service via a data network such as a 4G or 5G network. In some examples, a Firebase real-time database 60 may be used.

In some examples, the first API 26 may be in communication with a driver validation service 38, such as the DVLA, to check that users who act as driver's are suitably registered and licensed, with suitably registered and licensed vehicle. The first API 26 may also be in communication with an SMS bulk service 36. In some examples, the SMS bulk service 36 may be used to communicate marketing communications to individual users or groups of users. These may include reward-based incentives or discounts for repeat users, or promotional discounts for groups of users. A logging service, such as a Talon.ONE service can be used log activities and milestones reached by users and assign rewards, defined by sets of rules.

The transport coordination application 1 is loaded on the UE 2, 4, 6, 8, 10, 12, 14. The transport coordination application 1 includes a mapping module 46, such as a MapBox SDK. The mapping module 46 is in communication with an external mapping service 44, such as a MapBox API. The application 1 can further include a data capture module 48, such as a MicroBlink SDK. The data capture module 48 is in communication with an external data capture service 42, such as a MicroBlink API. The data capture module 48 can be used to scan a user's driver's licence, to provide the information thereon as plain text. This is beneficial as it allows for a check that the licence has not been used before and that all drivers are unique and have a driving licence. This information can also be used to check for issues associated with the licence such as penalty points. The application 1 can further include an address capture module 50, such as a What3words module, to identify geographical coordinates of addresses entered to or received by the application 1. The address capture module 50 can be in communication with an external address capture service 40, such as a What3words API.

An administration dashboard 52 can be in communication with the server 16 to administer and control the system. The administration dashboard 52 can perform token authentication 54 with the first API 26 at the server 16 in order to access the server 16 for control purposes.

Figure 7:
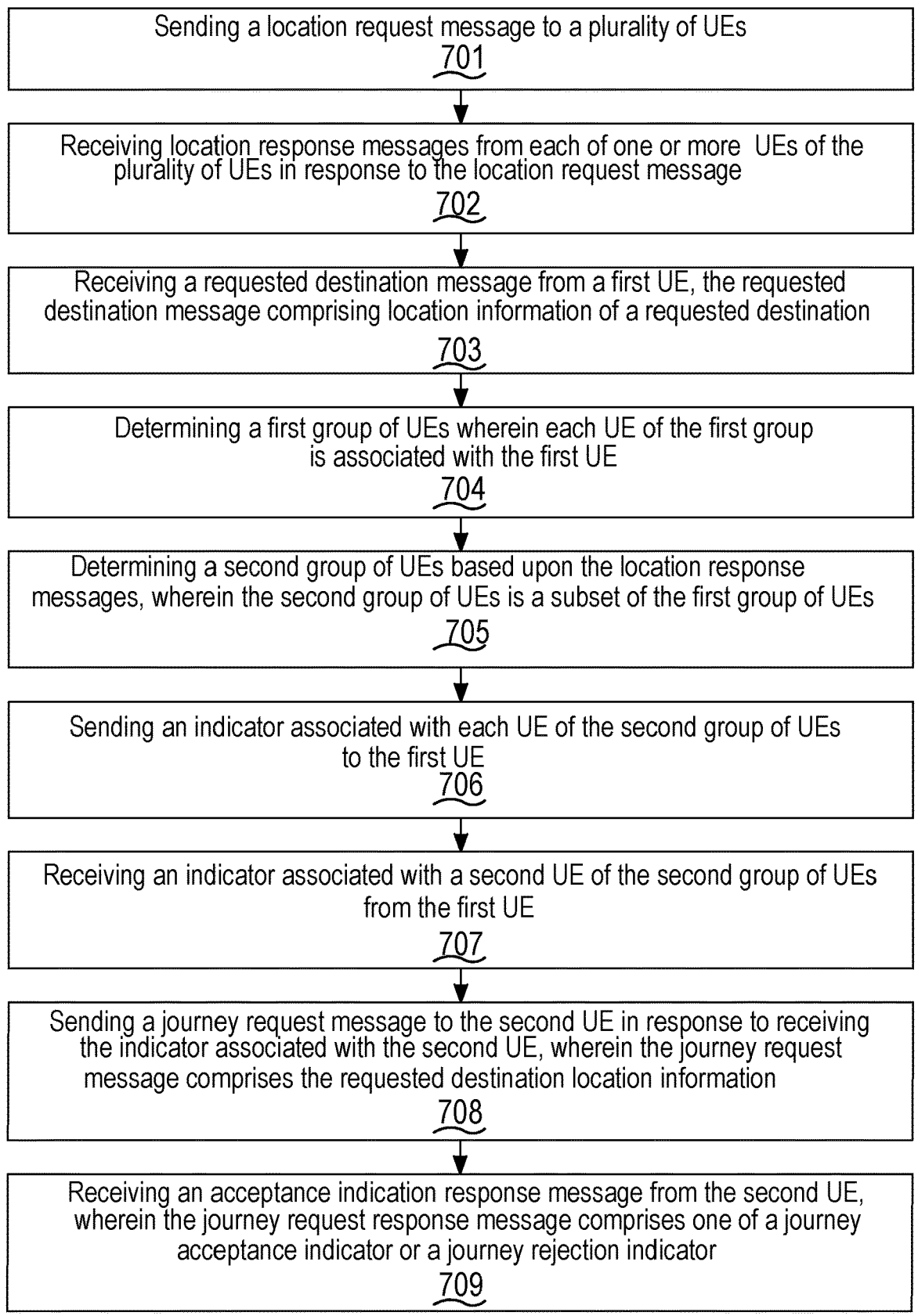
FIG. 7 is a flow diagram of a process for connecting UEs to coordinate a transport request.

FIG. 7 shows a flow diagram of a process for connecting UEs to coordinate a transport request, in accordance with the previously described embodiments.

Step 701 comprises sending a location request message to a plurality of UEs.

Step 702 comprises receiving location response messages from each of one or more UEs of the plurality of UEs in response to the location request message, wherein the location response message from each UE comprises respective location information of the UE.

Step 703 comprises receiving a requested destination message from a first UE, the requested destination message comprising location information of a requested destination.

Step 704 comprises determining a first group of UEs wherein each UE of the first group is associated with the first UE.

Step 705 comprises determining a second group of UEs based upon the location response messages, wherein the second group of UEs is a subset of the first group of UEs.

Step 706 comprises sending an indicator associated with each UE of the second group of UEs to the first UE.

Step 707 comprises receiving an indicator associated with a second UE of the second group of UEs from the first UE.

Step 708 comprises sending a journey request message to the second UE in response to receiving the indicator associated with the second UE, wherein the journey request message comprises the requested destination location information.

Step 709 comprises receiving an acceptance indication response message from the second UE, wherein the journey request response message comprises one of a journey acceptance indicator or a journey rejection indicator.

In an example, the steps of FIG. 7 are executed at the server 16. In examples, the steps of FIG. 7 relate to the steps described with reference to FIGS. 3A, 3B and 5. The skilled person will readily understand that the steps of FIG. 7 can take place in any suitable order, and not only the order presented. For example, steps 703 and 704 may take place before steps 701 and 702 such as in the embodiment described with reference to FIG. 3A, or after steps 701 and 702 such as in the embodiment described with reference to FIG. 3B.

The processing steps described herein, particularly with reference to the steps performed by the UEs and server in FIGS. 1, 3 to 5 and 7 may be stored in a non-transitory computer-readable medium, or storage, associated with the UE or server. A computer-readable medium can include non-volatile media and volatile media. Volatile media can include semiconductor memories and dynamic memories, amongst others. Non-volatile media can include optical disks and magnetic disks, amongst others.

It will be readily understood to the skilled person that embodiments and examples in the foregoing description are not limiting; features of each embodiment and example may be incorporated into the other embodiments and examples as appropriate.

The invention claimed is:

1. A computer-implemented method of connecting user equipments (UEs) to coordinate a transport request, the method comprising:
  sending, by a server, a location request message to a plurality of user equipments;
  receiving, at the server, location response messages from each of one or more UEs of the plurality of UEs in response to the location request message, wherein the location response message from each UE comprises respective location information of the UE;
  receiving, at a server, a requested destination message from a first UE, the requested destination message comprising location information of a requested destination;
  determining, by the server, a first group of UEs wherein each UE of the first group is associated with the first UE;
  determining, by the server, a second group of UEs based upon the location response messages, wherein the second group of UEs is a subset of the first group of UEs;
  sending, by the server, an indicator associated with each UE of the second group of UEs to the first UE;
  receiving, at the server, an indicator associated with a second UE of the second group of UEs from the first UE;
  sending, by the server, a journey request message to the second UE in response to receiving the indicator associated with the second UE, wherein the journey request message comprises the requested destination location information; and
  receiving, at the server, an acceptance indication response message from the second UE, wherein the journey request response message comprises one of a journey acceptance indicator or a journey rejection indicator.

2. The method of claim 1, further comprising:
  determining, by the server, whether the acceptance indication response message comprises the journey acceptance indicator or the journey rejection indicator;
  sending, by the server, an acceptance notification message to the first UE when the acceptance indication response message comprises the journey acceptance indicator; and
  sending, by the server, a rejection notification message to the first UE when the acceptance indication response message comprises the journey rejection indicator.

3. The method of claim 2, further comprising:
  when the acceptance indication response message comprises the journey acceptance indicator:
  receiving, at the server, location information from the second UE and relaying, by the server, the GPS position information of the second UE to the first UE; and
  displaying, on a user interface of the first UE, a map showing a location of the second UE based upon the relayed location information of the second UE.

4. The method of claim 3, further comprising:
  displaying, on a user interface of the second UE, a map showing a location of the first UE, and navigational information to a location of the first UE.

5. The method of claim 3, further comprising:
  determining, at the first UE and/or the second UE, that the first UE and the second UE have a coincident location; and
  displaying, on a user interface of the second UE, a map with navigational information to a location corresponding to the requested destination location information in response to determining that the first UE and the second UE have a coincident location.

6. The method of claim 1, wherein the requested destination message further comprises a requested journey time, the requested journey time indicating a time at which a journey to the requested destination is to take place, or a time at which the request destination is to be reached.

7. The method of claim 2, further comprising:
  receiving, at the server, an indicator associated with a third UE of the second group of UEs from the first UE in response to the server sending the rejection notification message to the first UE.

8. The method of claim 7, further comprising:
  sending, by the server, a journey request message to the third UE, wherein the journey request message comprises the requested destination location information; and
  receiving, at the server, an acceptance indication response message from the third UE, wherein the journey request response message comprises one of the journey acceptance indicator or the journey rejection indicator.

9. The method of claim 1, wherein the first group of UEs comprises UEs associated with respective user profiles stored at the server that are connected with a first user profile associated with the first UE.

10. The method of claim 1, wherein determining the second group of UEs based upon the location response messages comprises:
  determining a predetermined number of UEs of the first group of UEs with respective location information closest to location information of the first UE.

11. The method of claim 1, wherein location information comprises at least one of geographical coordinates, a GPS position, a GNSS position, a regional navigation system position or a cellular location.

12. The method of claim 1, wherein determining the second group of UEs further comprises applying one or more filters based upon user profile attributes of user profiles stored at the server and associated with each UE of the first group of UEs.

13. The method of claim 1, wherein sending the location request message to the plurality of UEs comprises sending the location request message to all UEs registered at the server that are associated with a profile having a predetermined attribute stored at the server; and
wherein the predetermined attribute indicates that the profile associated with the UE is a profile of a user that is capable of providing transport.

14. The method of claim 1, wherein sending the location request message to the plurality of UEs comprises sending the location request message to each UE of the first group of UEs.

15. The method of claim 1, further comprising:
displaying, on a user interface of the second UE, journey request information including an indicator of a user profile associated with the first UE and a location based upon the requested destination location information; and
providing, by the second UE, an input means to accept or reject a journey request based upon the displayed journey request information.

16. The method of claim 15, further comprising:
sending, by the second UE, the acceptance indication response message comprising the journey acceptance indicator to the server in response to a user of the second UE selecting the input means to accept the journey request; or
sending, by the second UE, the acceptance indication response message comprising the journey rejection indicator to the server in response to the user second UE selecting the input means to reject the journey request; or
sending, by the second UE, the acceptance indication response message comprising the journey rejection indicator to the server in response to the expiration of a predetermined time period when no selection to accept or reject the journey request is input at the input means.

17. The method of claim 1, further comprising:
accessing, at the first UE, a telephone number of a contact stored in a contact list at the first UE;
hashing, at the first UE, the telephone number of the contact to create a hashed contact telephone number; and
sending, by the first UE, the hashed contact telephone number to the server.

18. The method of claim 17, wherein the server stores a plurality of user profiles, each user profile comprising a hashed user telephone number corresponding to a UE associated with the user profile, and the method further comprises:
receiving, at the server, the hashed contact telephone number from the first UE;
storing, at the server, the hashed contact telephone number in a first user profile associated with the first UE;
matching, at the server, the hashed contact telephone number with a hashed user telephone number of a second user profile associated with a second UE; and
marking, at the server, each of the first user profile and the second user profile as connections with each other in response to matching the hashed contact telephone number in the first user profile with the hashed user telephone number in the second user profile.

19. A server arranged to:
send a location request message to a plurality of user equipments (UEs);
receive location response messages from each of one or more UEs of the plurality of UEs in response to the location request message, wherein the location response message from each UE comprises respective location information of the UE;
receive a requested destination message from a first UE, the requested destination message comprising location information of a requested destination;
determine a first group of UEs wherein each UE of the first group is associated with the first UE;
determine a second group of UEs based upon the location response messages, wherein the second group of UEs is a subset of the first group of UEs;
send an indicator associated with each UE of the second group of UEs to the first UE;
receive an indicator associated with a second UE of the second group of UEs from the first UE;
send a journey request message to the second UE in response to receiving the indicator associated with the second UE, wherein the journey request message comprises the requested destination location information; and
receive an acceptance indication response message from the second UE, wherein the journey request response message comprises one of a journey acceptance indicator or a journey rejection indicator.

20. A non-transitory computer-readable medium storing instructions which, when executed by one or more processors, cause the one or more processors to:
send a location request message to a plurality of user equipments (UEs);
receive location response messages from each of one or more UEs of the plurality of UEs in response to the location request message, wherein the location response message from each UE comprises respective location information of the UE;
receive a requested destination message from a first UE, the requested destination message comprising location information of a requested destination;
determine a first group of UEs wherein each UE of the first group is associated with the first UE;
determine a second group of UEs based upon the location response messages, wherein the second group of UEs is a subset of the first group of UEs;
send an indicator associated with each UE of the second group of UEs to the first UE;
receive an indicator associated with a second UE of the second group of UEs from the first UE;
send a journey request message to the second UE in response to receiving the indicator associated with the second UE, wherein the journey request message comprises the requested destination location information; and
receive an acceptance indication response message from the second UE, wherein the journey request response message comprises one of a journey acceptance indicator or a journey rejection indicator.

* * * * *